(12) United States Patent
Fehnel et al.

(10) Patent No.: US 8,108,244 B2
(45) Date of Patent: Jan. 31, 2012

(54) FORECASTING DEMAND AND AVAILABILITY OF RESOURCES OF A MILITARY INSTALLATION

(75) Inventors: Scott Keith Fehnel, Leawood, KS (US); Nathan Lee Otto, Kansas City, MO (US)

(73) Assignee: HNTB Holdings Ltd, Kansas City, MO (US)

( * ) Notice: Subject to any disclaimer, the term of this patent is extended or adjusted under 35 U.S.C. 154(b) by 0 days.

(21) Appl. No.: 13/040,064

(22) Filed: Mar. 3, 2011

(65) Prior Publication Data

US 2011/0153382 A1    Jun. 23, 2011

Related U.S. Application Data

(63) Continuation of application No. 11/945,961, filed on Nov. 27, 2007, now Pat. No. 7,917,385.

(60) Provisional application No. 60/867,345, filed on Nov. 27, 2006.

(51) Int. Cl.
*G06F 17/00* (2006.01)

(52) U.S. Cl. ...................................................... 705/7.31
(58) Field of Classification Search .................. 705/7.31
See application file for complete search history.

(56) References Cited

U.S. PATENT DOCUMENTS

| | | | |
|---|---|---|---|
| 7,107,285 B2 * | 9/2006 | von Kaenel et al. ................... 1/1 |
| 2005/0149372 A1 * | 7/2005 | Kite et al. .......................... 705/8 |
| 2005/0197875 A1 * | 9/2005 | Kauffman .......................... 705/7 |
| 2006/0184406 A1 * | 8/2006 | Scott et al. ......................... 705/7 |

* cited by examiner

*Primary Examiner* — Thomas Dixon
(74) *Attorney, Agent, or Firm* — Shook, Hardy & Bacon L.L.P.

(57) ABSTRACT

Methods and computer systems for forecasting demand and availability of resources of a geographic region are provided. Physical, operational, traffic and construction data for a geographic region for a specified time period is utilized to compare the operational needs for at least one resource for a geographic region to the available resources to forecast demands and availability of the at least one resource for the geographic region over the specified time period and determine whether the demand for the at least one resource exceeds the availability of the at least one resource. The forecasted demand and availability of the at least one resource for the geographic region for the specified time period is stored and presented.

20 Claims, 23 Drawing Sheets

FORECASTING DEMAND AND AVAILABILITY OF RESOURCES OF A MILITARY INSTALLATION

CROSS-REFERENCE TO RELATED APPLICATIONS

This application claims is a continuation of U.S. patent application Ser. No. 11/945,961, filed on Nov. 27, 2007, which claims the benefit of U.S. Provisional Application No. 60/867,345, filed Nov. 27, 2006. The aforementioned applications are hereby incorporated herein by reference in their entirety.

SUMMARY

This summary is generally provided to introduce the reader to one or more concepts described in the detailed description in a simplified form. This summary is not intended to identify the invention or even key features, which is the purview of the claims below.

In one embodiment, methods and computer systems for forecasting demand and availability of resources of a geographic region are provided. Physical, operational, traffic and construction data for a geographic region for a specified time period is utilized to compare the operational needs for at least one resource for a geographic region to the available resources to forecast demands and availability of the at least one resource for the geographic region over the specified time period and to determine whether the demand for the at least one resource exceeds the availability of the at least one resource. The forecasted demand and availability of the at least one resource for the geographic region for the specified time period is stored and presented.

In another embodiment, a computer system for forecasting demand and availability of resources of a geographic region is provided. The computer system includes a receiving component configured for receiving and facilitating the storing of physical, operational, traffic and construction data for a geographic region for a specified time period. The computer system further includes a comparing component configured for comparing the operational needs for at least one resource for a geographic region for a specified time period from the operational data to the resources indicated as being available from the physical data, construction data and traffic data to forecast demands and availability of the at least one resource for the geographic region over the specified time period and to determine if the demand for the at least one resource exceeds the availability of the at least one resource. The computer system further includes a storing component that stores the forecasted demand and availability of the at least one resource for the geographic region for the specified time period.

In another embodiment, a computer system for scheduling resources for a geographic region is provided. A receiving component receives a request for scheduling one or more resources of the geographic region and a determining component for determining the availability of the resource. A priority component determines the priority of the one or more resources and the priority of the group for which the resources are being scheduled. A resource scheduling component schedules the one or more resources. An associating component associates and stores the scheduled resources, group and location of the resources scheduled on a geospatial model.

In yet another embodiment, a computer-implemented method for forecasting demand and availability of resources for a military installation is provided. Physical, operational, traffic and construction data for a military installation for a specified time period is received and stored. The operational needs for at least one resource for the military installation for a specified time period from the operational data are compared to the resources indicated as being available from the physical data, construction data and traffic data to forecast demands and availability of the at least one resource for the geographic region over the specified time period and to determine if the demand for the at least one resource exceeds the availability of the at least one resource. The forecasted demand and availability of the at least one resource for the military installation for the specified time period is stored and presenting to a user in a geospatial model.

BRIEF DESCRIPTION OF THE SEVERAL VIEWS OF THE DRAWINGS

Embodiments of the present invention are described in detail below with reference to the attached drawing figures, wherein.

DETAILED DESCRIPTION OF THE INVENTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
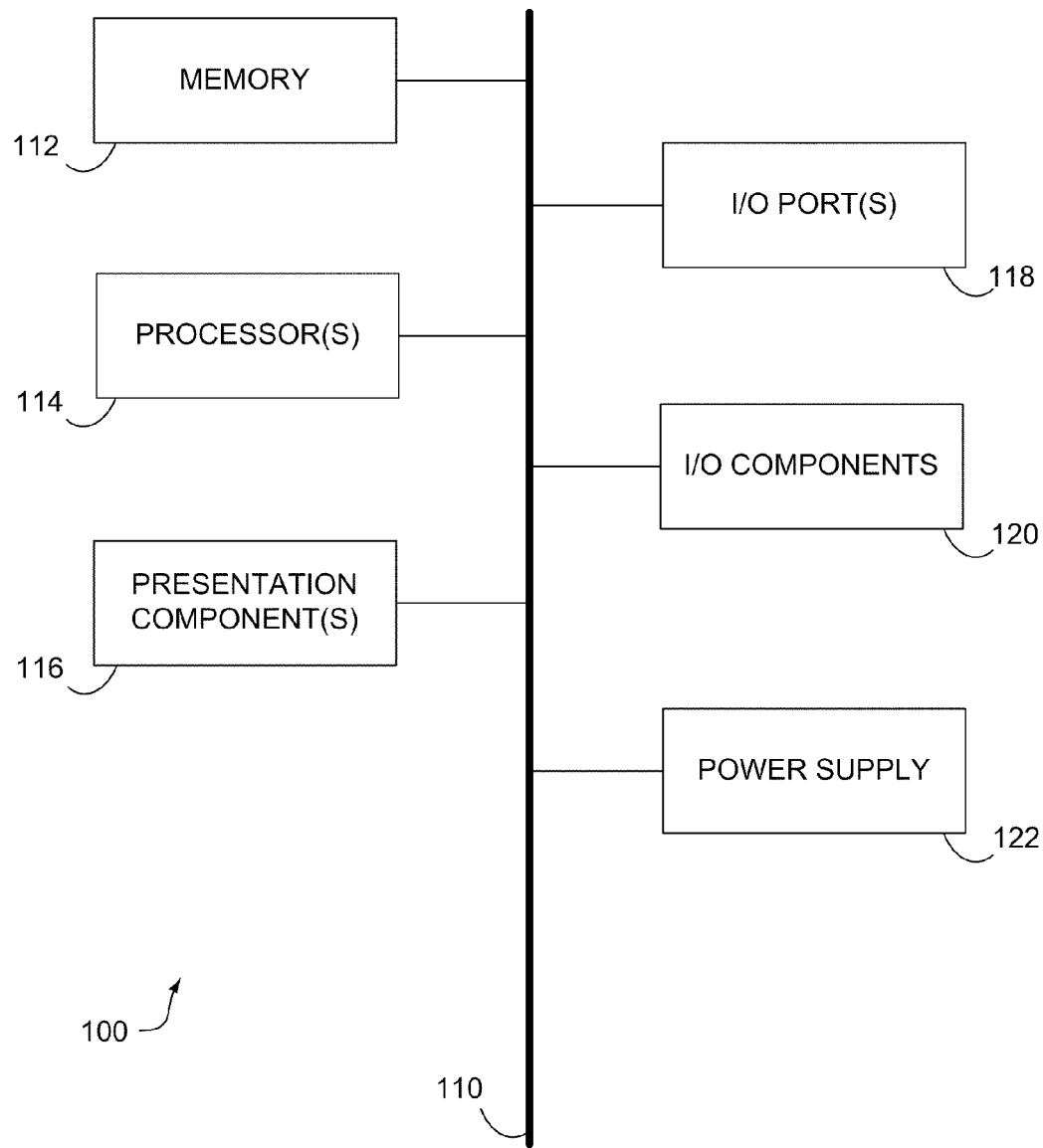
FIG. 1 is a block diagram of a computing system environment suitable for use in implementing the present invention.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
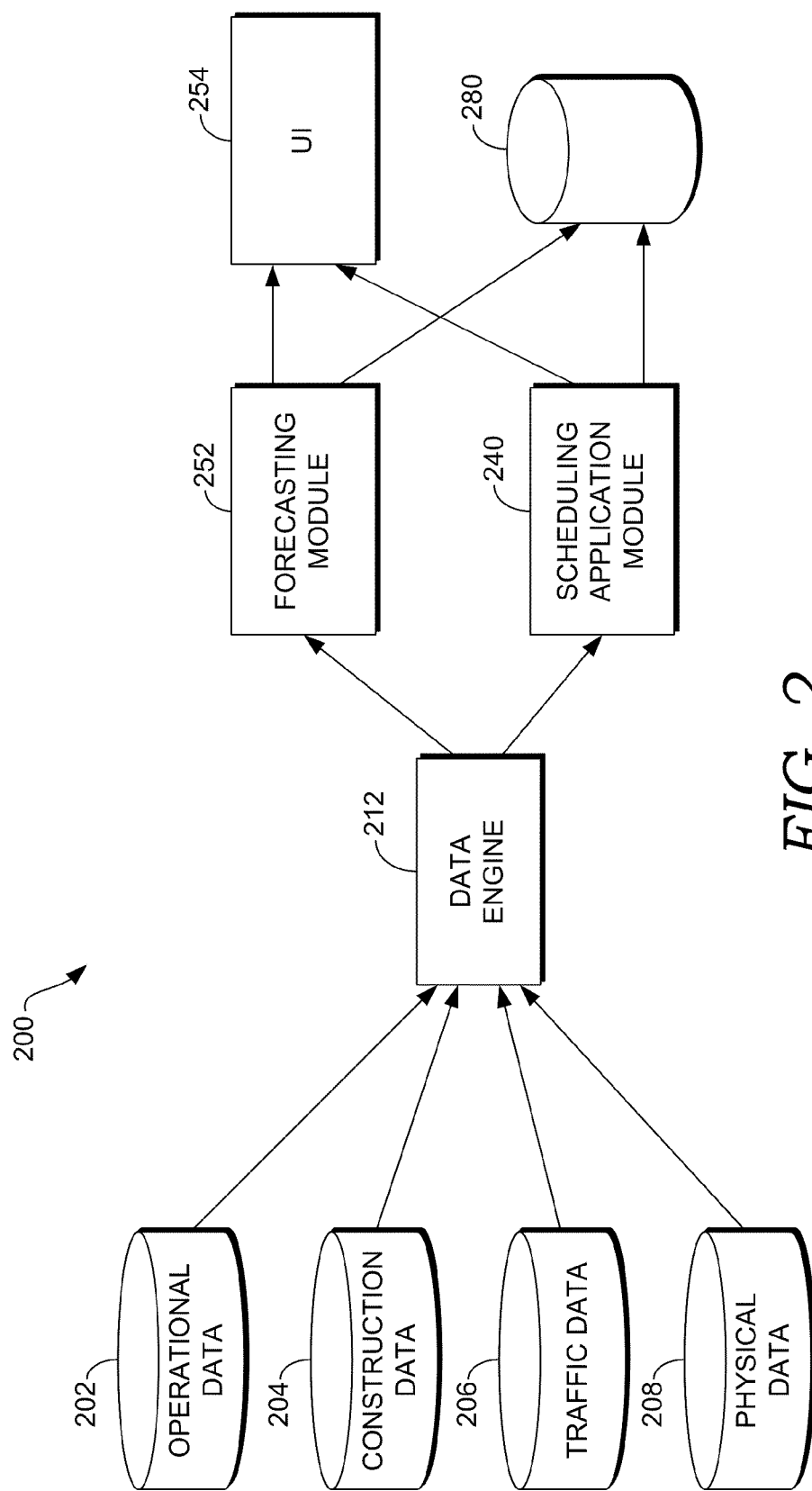
FIG. 2 is a block diagram of a computer system that forecasts and schedules resources for a geographic region in accordance with embodiments of the present invention.

Embodiments of the present invention provide computer systems, computer-implemented methods, systems, methods and computer-readable media for automatically forecasting and scheduling resources for a geographic region for a period of time. FIG. 2 illustrates a system 200 for forecasting and scheduling resources for a geographic region. A geographic region is also a defined geographic area. In one embodiment, a geographic region is more than one (1) square mile, while in other embodiments, a geographic region is more than ten (10) square miles in size. Exemplary geographic regions may have native terrain, roadways, buildings, structures, parks and other infrastructure. Exemplary regions may include military installations, army bases, naval bases, air force bases, municipalities, cities, states, universities, schools and airports.

The system 200 includes a forecasting module 252 and a scheduling module 240. The forecasting module 252 utilizes operational data 202, construction data 204, traffic data 206, and physical data 208 to forecast demand and availability for at least one resource for the geographic region. In some embodiments the forecasting module 252 utilizes data 202, 204, 206 and 208 to forecast multiple resources for a geographic region. The scheduling module 240 receives requests for scheduling a group for one or more resources of a geographic region, and associates a scheduled resource for the group with a geospatial model.

The system 200 may include a data engine 212. The data engine 212 is a module that may be configured to process a variety of data for use by the forecasting module 252 and scheduling module 240 and for display on or within graphical user interface 254. The data engine 212 receives information in the form of digital data from data sources 202, 204, 206 and 208. Data engine 212 may parse and process digital data and store it in storage modules so that it may be utilized by modules 240 and 252. It will be appreciated that a variety of data may be transferred from data stores 202, 204, 206 and 208 to data engine 212. It will also be appreciated while data stores 202, 204, 206 and 208 are depicted as being a plurality of storage devices, data may be stored in one integrated database, multiple databases or a single or multiple database clusters. It will be appreciated that data sources 202, 204, 206 and 208 may include third-party data, such as government and municipality data.

Operational data store 202 includes data such as required resources to complete certain requirements and/or requests. Resources may include buildings, rooms, land, roadways, repairs, personnel, groups and transportation. The operational data includes business rules related to the resources. The operational data may include what is needed to complete requirements. For example, if a roadway is in need of repair, the business rules may include the resources such as personnel, consumables and timing for repair of roadways within the geographic region. In another example, a soldier for a particular unit of the army may need to complete a particular course of study. The operational data may include the physical ranges and classrooms needed to complete the study, along with the consumables (ammunition and weapons) and instructors to complete the course of study.

Construction data store 204 includes information and data regarding the completion of construction, such as construction of buildings and infrastructure. Exemplary construction data may include identification of the construction, type of construction, estimated start and competition dates of constructions, engineering documents and potential impacts on other facilities, environment and other construction.

Traffic data store 206 includes traffic data such as baseline traffic flow, traffic related to training executions, traffic related to construction, routes and alternative routes, and peak flow. Baseline flow traffic data includes normal traffic information for the geographic region. Training execution-related traffic includes traffic for the travel of groups or units within the geographic region, such as a military base. Construction-related traffic data includes traffic information regarding construction vehicles moving and closed roads due to construction. Peak flow traffic data includes rush hour traffic flow such as in the morning and evening. Traffic data may also include pedestrian traffic information, road closures, different road networks for different vehicles (e.g., such as roads for tanks vs. roads for passenger vehicles). Although the traffic data is depicted with reference to a military base, it will be appreciated that the construction data may apply to any geographic region.

Physical data store 208 stores data related to civil information, architectural, roadway, electrical, water/wastewater, communications, housing, ranges, environmental, training, air field operations, road networks, terrain, building locations, unit locations, range locations, training facility locations, and classroom locations. The physical data may also include digital aerial and satellite images and digital maps. In some embodiments the physical data may be utilized to create a geospatial model for the geographic region. The geospatial model may be two-dimensional or three-dimensional. A three-dimensional geospatial model may be a digital terrain model having X, Y, and Z coordinates. A three-dimensional Cartesian coordinate system may be utilized to develop a digital terrain model. The X coordinate is conventionally the horizontal coordinate in the coordinate system, the Y coordinate is typically a vertical coordinate, and the Z coordinate typically provides a reference in the three-dimensional space. It will be appreciated that a geospatial model may also be created utilizing 2-dimensional aerial images, satellite images, digital maps and scanned maps.

As shown in FIG. 2, system 200 includes a forecasting module 252 and a scheduling module 240. Although depicted as part of system 200, in some embodiments, one or more of the illustrated modules may be implemented as stand-alone applications. In other embodiments, one or more of the illustrated modules may be integrated directly into an operating system of a server or an end-user device. It will be understood that the modules illustrated in FIG. 2 are exemplary in nature and in number and should not be construed as limiting. Any number of modules may be employed to achieve the desired functionality within the scope of embodiments. Further, modules may be located on any number of servers of computers.

Forecasting module 252 is configured to forecast the demand and availability of resources of a geographic region for a given time period. It will be appreciated that the time period for forecasting resources for the geographic region may be for any period of time including an hour, a day, weeks, months and years. Resources may include, but are not limited to, one or more sets of equipment, buildings, classrooms, roadways, housing, personnel, consumables and facilities. Forecasting module 252 includes a receiving component for receiving operational data 202, construction data 204, traffic data 206 and physical data 208. It will also be appreciated that the operational data 202, construction data 204, traffic data 206 and physical data 208 may be bits of data received directly from the data stores or may be in the form of information processed by data engine 212.

The demand and availability of resources may depend on the number of times a resource has been requested to be utilized for a time period and the number of available resources. Forecasting module 252 also includes a comparing component for comparing the operational needs for resources from the operational data 202 to the resources indicated as being available from the physical data 208, construction data 204 and traffic data 206 to determine if there are enough resources to meet the operational needs. It will be appreciated that multiple resources may be forecasted for the geographical region. For example, the comparing component of forecasting module 252 matches training and housing needs for twenty (20) military units to be sent to a military base from July through September (data from operational database 202) to the available resources (e.g., barracks, classrooms, ranges, transportation, ammunition, weapons and instructors) for July through September as indicated in construction data 204, traffic data 206 and physical data 208 to assess whether there are enough available resources to meet the training and housing needs for the arriving twenty military units.

Forecasting module 252 also includes a storing component for storing the forecasted demand and availability of resources for the geographic region. The forecasted demand for one or more resources for the geographic region may be stored in data store 280.

Forecasting module 252 is in communication with user interface 254 to present the forecasted demands and available resources for a geographic region. It will be appreciated that the forecasted demands and available resources may be presented in a variety of ways. The forecasted resources and demands may be presented or displayed on a graphical user interface of a user device such as that shown in FIG. 8. The presentation may be bar graphs, graphical representations, numerical representations, and/or textual representations. The forecasted demand and availability of resources may be represented graphically in a geospatial model such as a two-dimensional aerial or satellite map. By way of example, with reference to FIG. 9, a graphical user interface 900 depicts a geospatial model 910 of a military base utilizing a digital satellite image. Interface 900 includes a graphical representation 915 of the forecasted available resources 920 (capabilities) versus the demand for resources 925 for the geographic region on Feb. 15, 2008 (905). In this example, the resources are small arms ranges on a military base.

Figure 9:
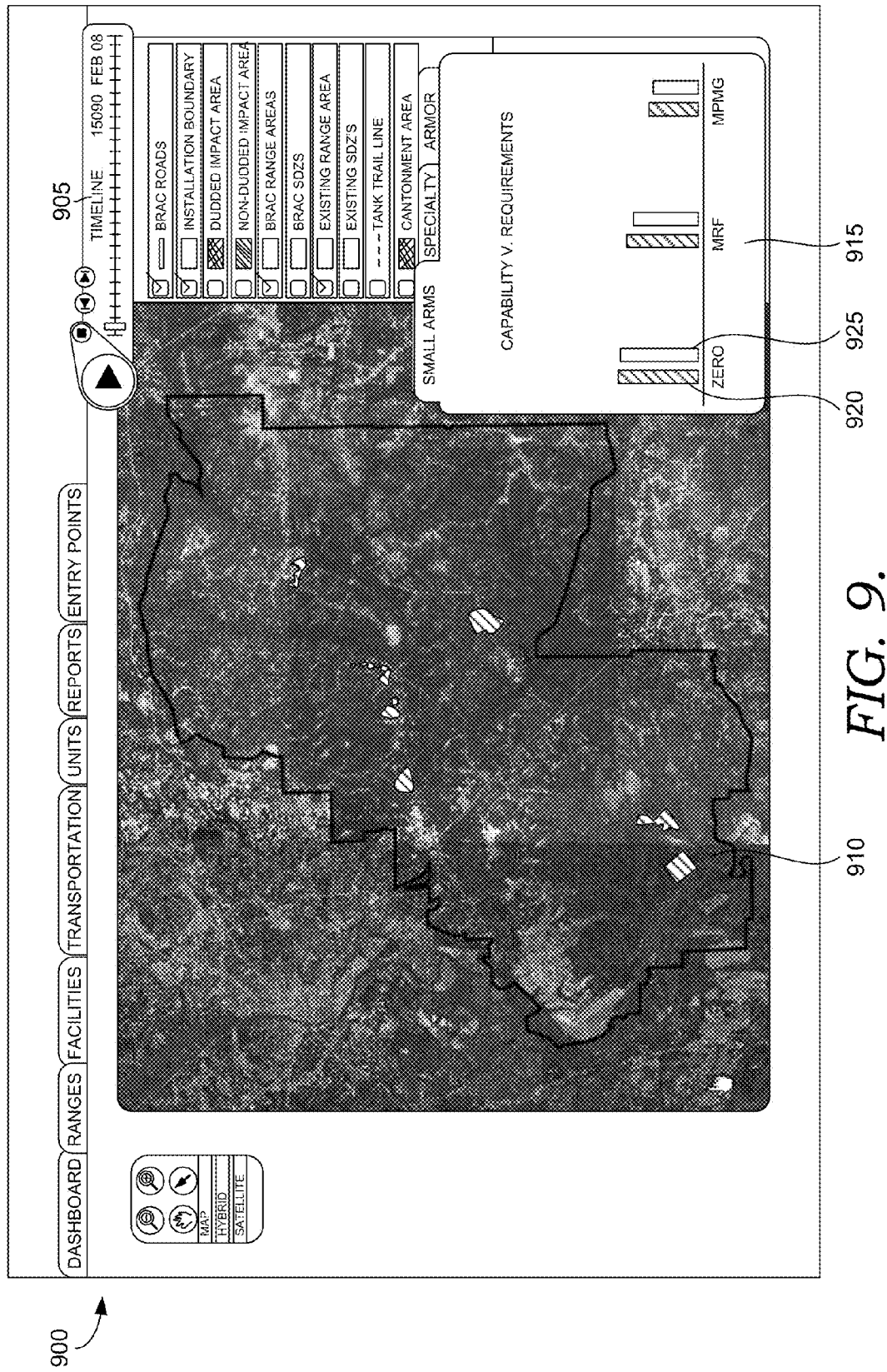
FIG. 9 depicts a graphical user interface that presents forecasted demand and availability of range resources in accordance with an embodiment of the present invention.
Figure 10:
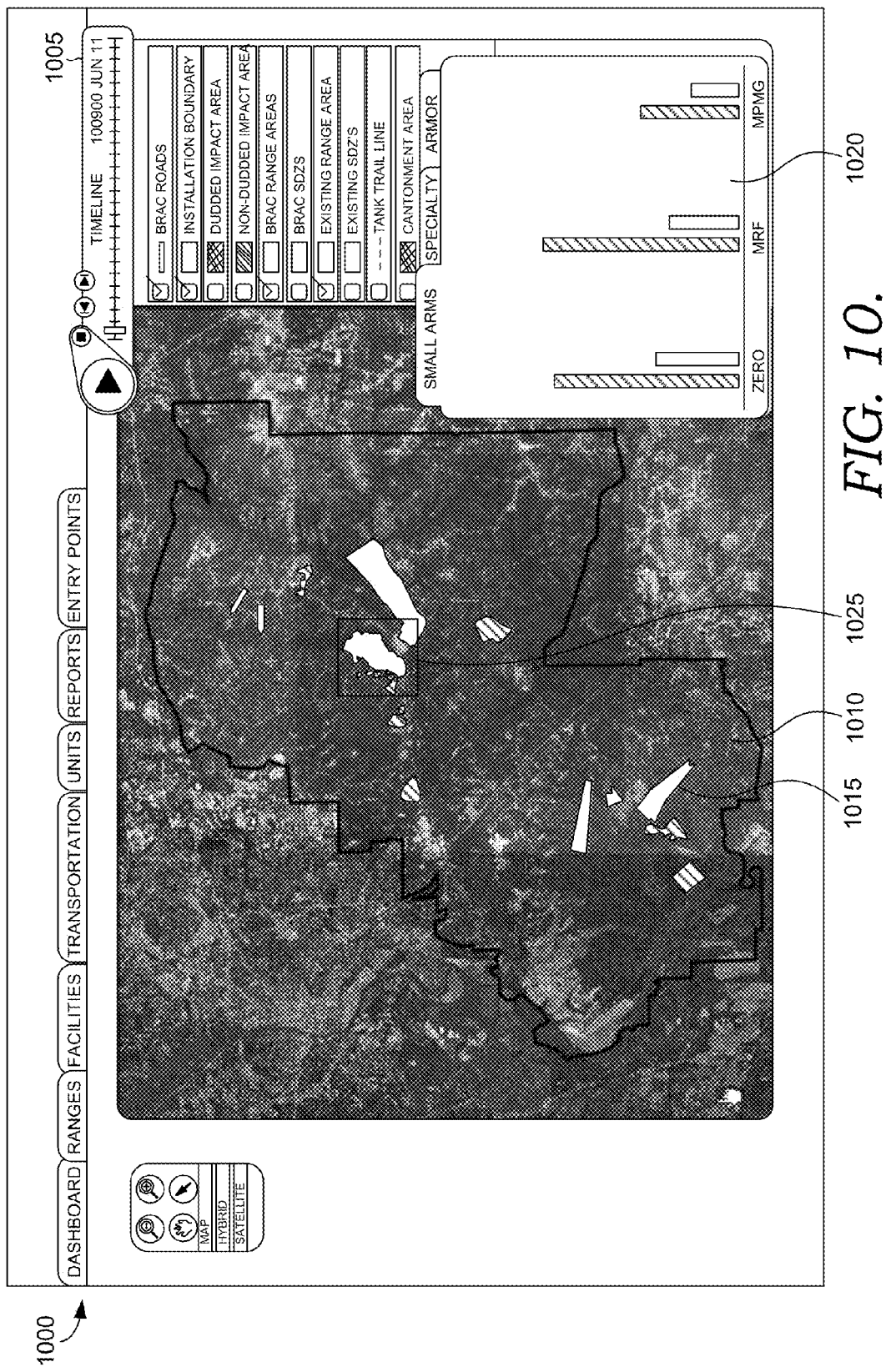
FIG. 10 depicts a graphical user interface that presents forecasted demand and availability of range resources over time in accordance with an embodiment of the present invention.
Figure 14:
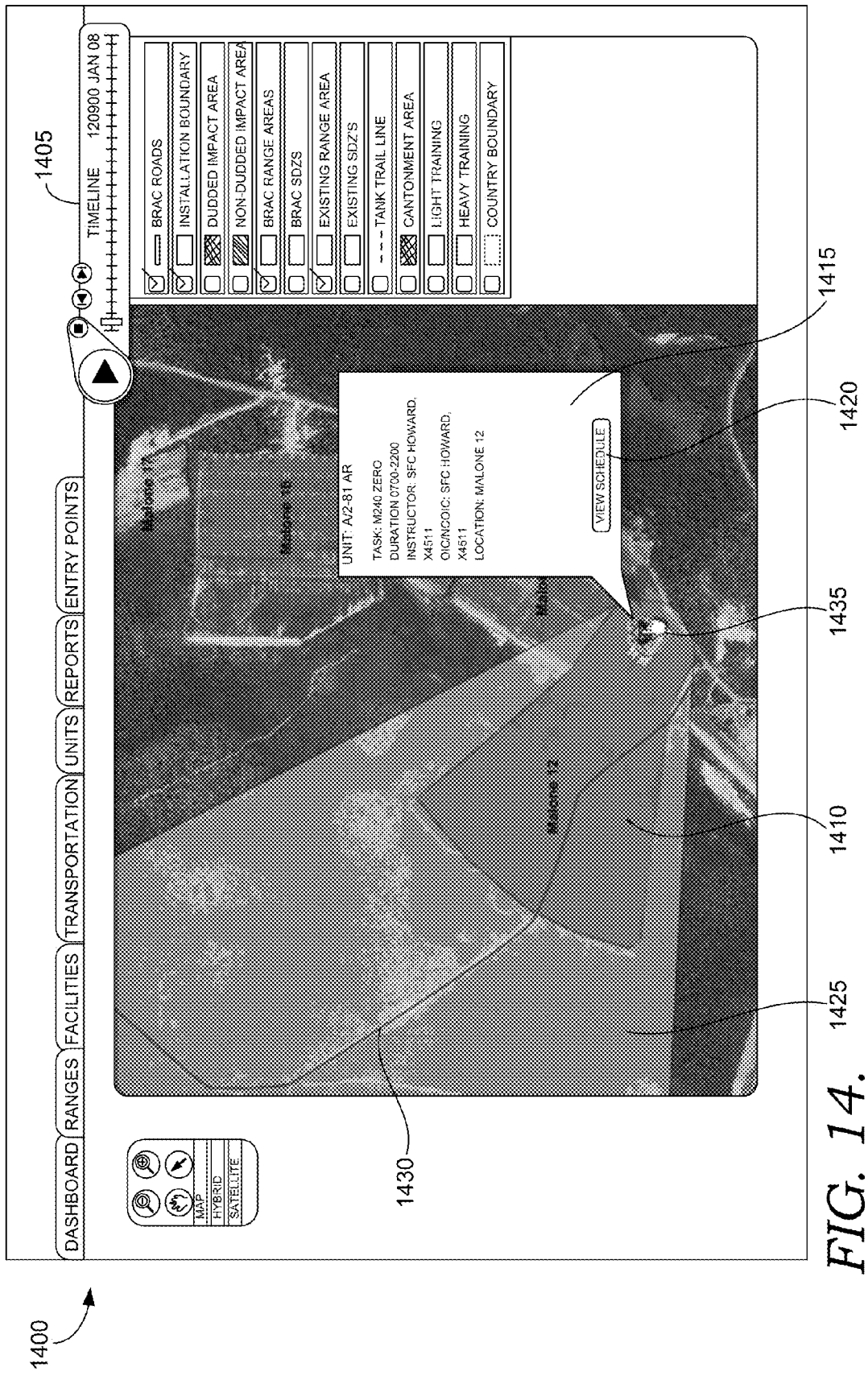
FIG. 14 depicts a graphical user interface that presents scheduling data for one or more resources within a geographic region on a geospatial model in accordance with an embodiment of the present invention.
Figure 22:
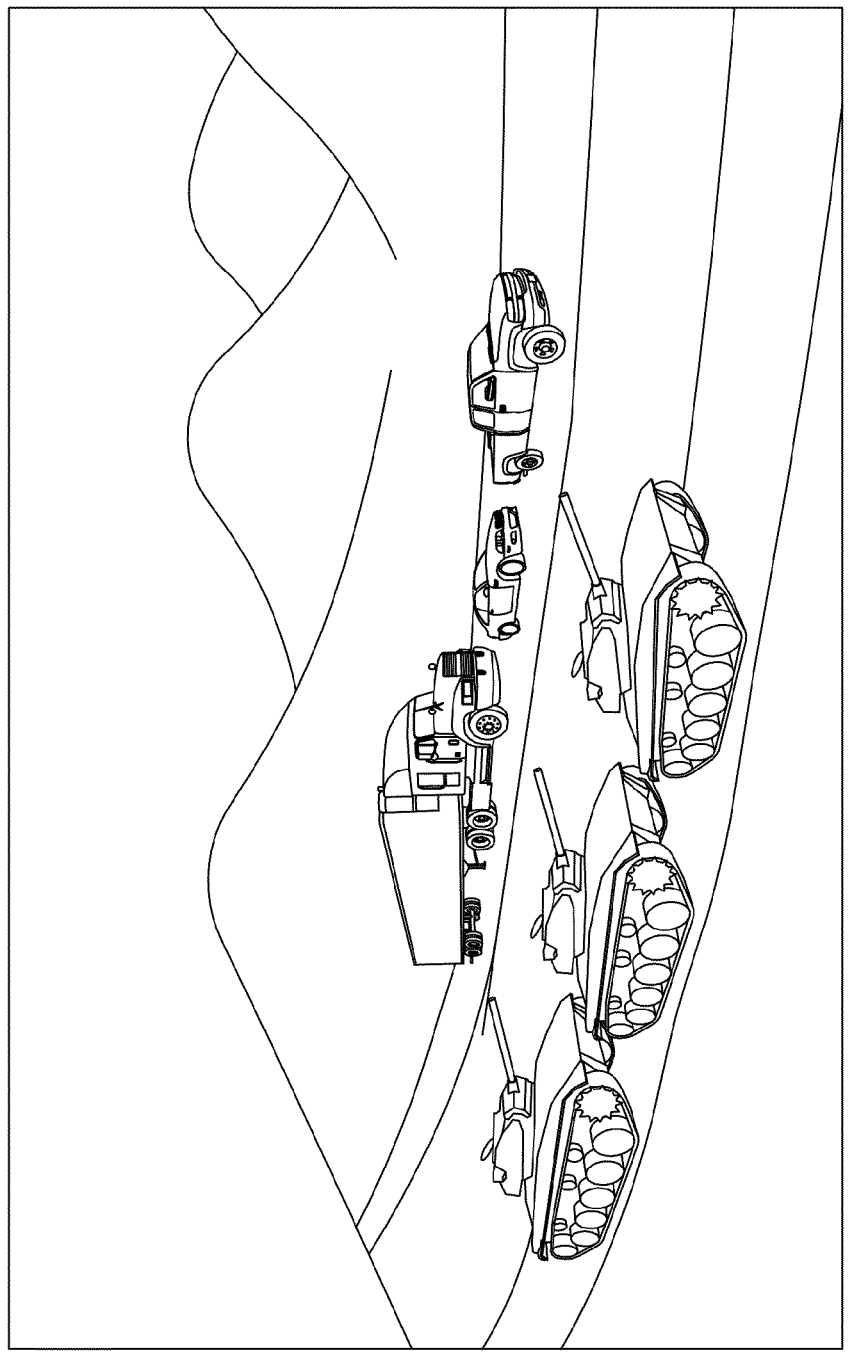
FIG. 22 depicts a graphical user interface of a three-dimensional geospatial model and forecasted traffic in accordance with an embodiment of the present invention.

A user can request to view a time lapsed view for the depicted resource. For example, with reference to FIG. 10, a time lapsed graphical user interface 1000 depicts the same geospatial model for the military base utilizing a digital satellite image. Interface 1000 includes a graphical representation 1020 of the forecasted available resources versus the demand for resources for the geographic region on Jun. 10, 2011 (1005). Again, in this example, the resources are small arms ranges on a military base. As can be seen from FIGS. 9 and 10, the forecasted available resources (ranges) has increased. The new forecasted ranges 1015 that are to be completed by the year 2011 are displayed on the geospatial model 1010. It will be appreciated that from the geospatial model, one or more resources may be selected or drilled down on to view scheduling information and information about the resource. For example, on FIG. 10, if range 1025 is selected by the user, a closer view of the range along with scheduling information for the range for the requested time period may be presented. An exemplary graphical user interface 1400 of the closer view of the geospatial model and requested resource is shown in FIG. 14. FIG. 14 depicts a close up image of a small arms range 1410 with related scheduling information 1415. In one embodiment, the forecasted demand and availability of resources may be presented in a three dimensional, digital train model as shown in FIG. 22. FIG. 22 is a graphical user interface 2200 presenting the forecasted demand and availability for roadway resources as a three-dimensional traffic model for a time period. It will be appreciated that three-dimensional modeling may be done utilizing any variety of methods and systems, including, but not limited to, the modeling described in U.S. patent application Ser. No. 11/469,679.

Scheduling module 240 is configured to schedule resources for the geographic region. The scheduling module 240 includes a receiving component for receiving a request for scheduling one or more resources of the geographic region. In one embodiment, the scheduling for the one or more resources is for scheduling a person or a group of persons to utilize the one or more resources. For example, on a military base, the leader of a military unit may request to schedule a classroom and a range so that his or her unit may complete their necessary training. In some embodiments, the request is approved by another user, such as an administrator or senior officer, before the resources may be scheduled. The scheduled resource information may also be utilized by forecasting module 252.

The scheduling module 240 further includes a determining component for determining the availability of the resource. The availability of the resource may be determined from the construction data 204, traffic data 206 and physical data 208. For example, it may be determined whether there is an available range for the requested time period.

The scheduling module further has a priority component for determining the priority of the group for which the resources are being scheduled. The priority component utilizes operational data 202 to determine the priority level of the request. In some embodiments, the priority level of the request may depend on the priority level of the person or group for which the request has been made. For example, where the geographic region is a military base, the priority of the person or unit may depend on whether or not the unit will be deployed for combat, when the unit will be deployed for combat, and what additional course work that the unit may need to complete. It will be appreciated that a priority level given to a request, person or group may be determined based on a variety of factors.

Scheduling module 240 also includes a resource scheduling component configured for scheduling the one or more resources. Again the resources may be scheduled based on availability of the resource for the given time period and may be based on priority of the request, person or group. The scheduled resource may be stored in a database, such as data store 208, and may also be communicated or presented to the requestor utilizing user interface 254.

The scheduling module 240 further includes an associating component configured for associating the scheduled resources, group and location of the resources scheduled on a geospatial model. The association may be stored in a database, such as data store 208 and presented or communicated utilizing a user interface, such as user interface 254.

Figure 3A:
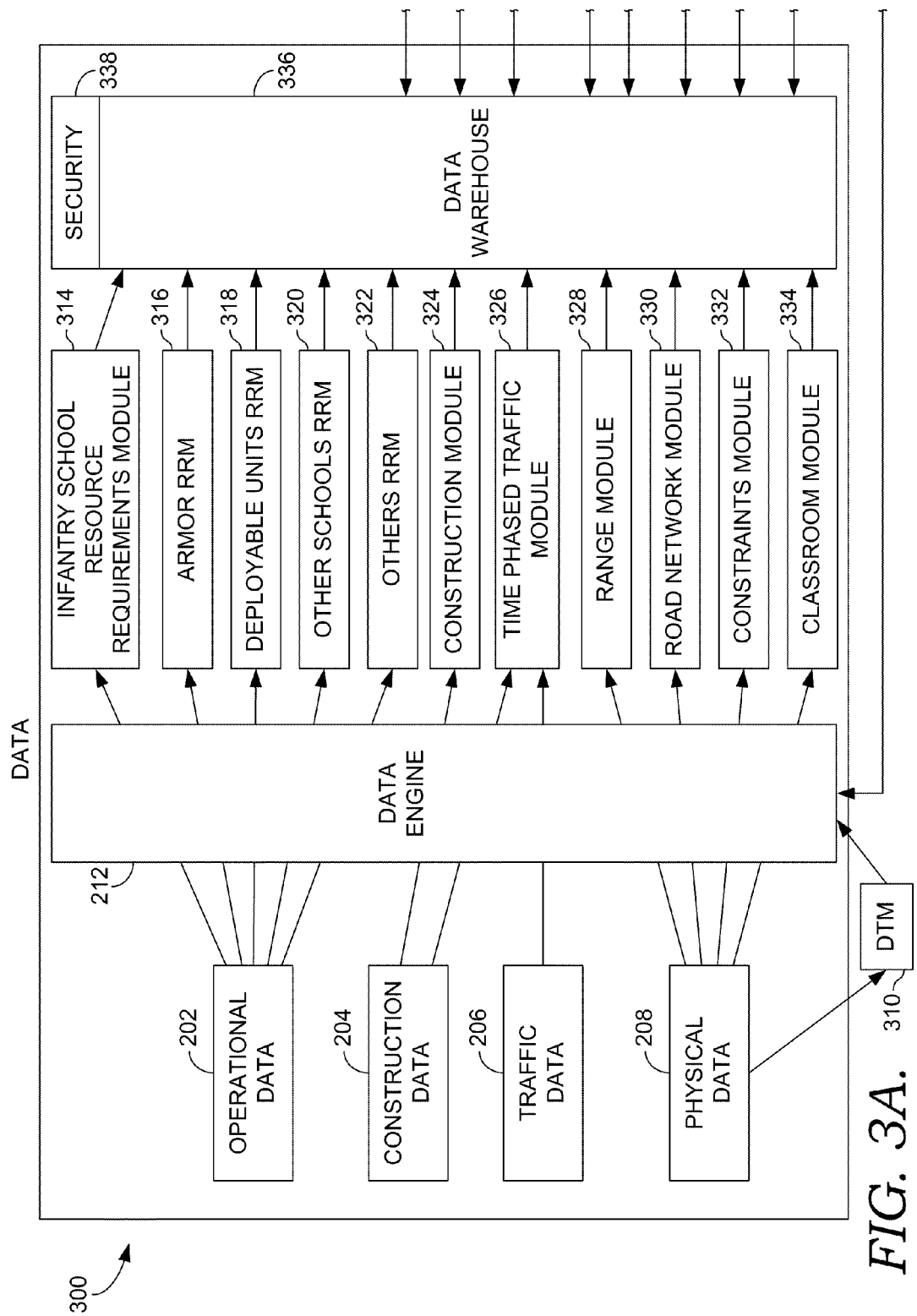
FIGS. 3A and 3B are schematic diagrams illustrating a system for forecasting and scheduling resources for a military installation in accordance with embodiments of the present invention.
Figure 3B:
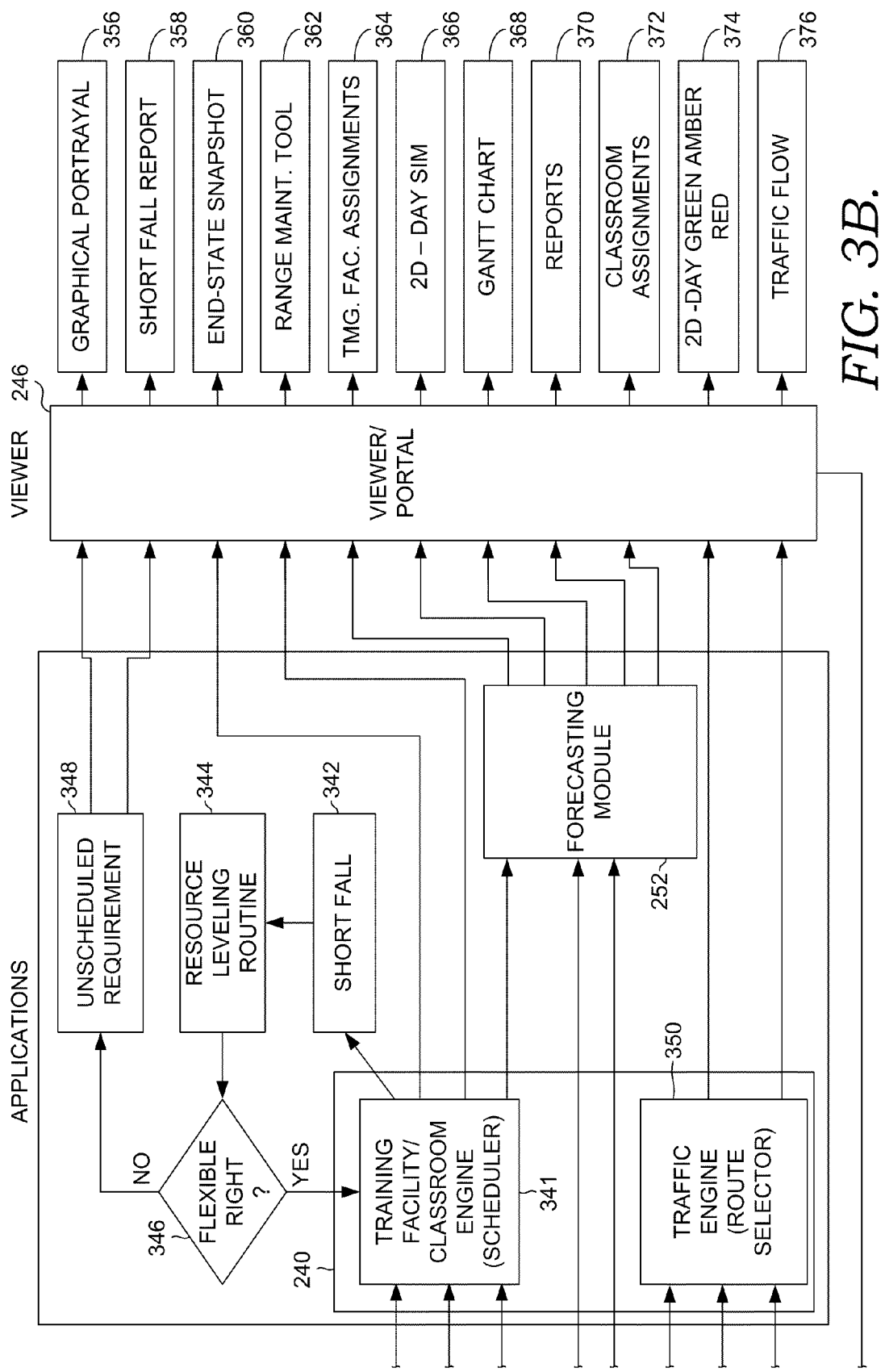

In some embodiments, one or more of the illustrated components may be implemented as stand-alone applications or may be integrated directly into an operating system of a server. It will be appreciated that the components illustrated and discussed in FIGS. 2, 3A and 3B are exemplary in nature and number and should not be construed as limiting. Any number of components may be employed to achieve the desired functionality within the scope of embodiments herein.

Referring next to FIGS. 3A and 3B, a system for forecasting and scheduling resources for a military base is provided. The system for forecasting and scheduling resources may be utilized for the Base Realignment and Closure (BRAC) 2005. Due to BRAC, certain military bases will yield a net increase of up to 15,000 additional soldiers, civilians and students. The system described in FIGS. 3A and 3B will assist in developing a Maneuver Center of Excellence (MCOE) operations model that will support the military installation, match training requirements for the influx of soldiers with available resources, identify resource shortfalls (new construction completion versus student load timing, understand the impact of the influx in soldiers, civilians and students on the road network) and assist the military installation in scheduling and maintaining training resources.

Operational data 202, construction data 204, traffic data 206 and physical data 208 may be parsed and processed by data engine 212 into usable information stored in modules. Exemplary modules include infantry school resource requirements module 314, armor RRM module 316, deployable units RRM module 318, other schools RRM module 320, other RRM modules 322, construction module 324, time phased traffic module 326, range modules 328, road network module 330, constraints module 332, and classroom module 334. Resource and requirement modules 314, 316, 318, 320 and 322 may include the fill schedules, course lay down schedules, specific lessons taught on each of the course lay down schedule, resources required to complete the lessons and a variety of training guidance information.

Construction module 324 may include construction information pertaining to corps of engineer schedules and requirements or any engineering entities schedule and requirements. The time phased traffic module 326 may include traffic information such as construction related traffic, traffic simulation that reflects how the army moves and origin/destination specific movement information. Range module 328 may include information regarding range facility management, listing of ranges and capabilities of the ranges. Road network module 330 may include physical data such as a geospatial information system and the like. Constraints module 332 may contain information regarding the environment of the geographic region (e.g., bodies of water, woodlands, deserts, swamps and the like). Classroom module 334 includes facilities information, simulators and parade grounds. The information in modules 314-334 is stored in data warehouse 336 so that it may be utilized by scheduling module 240 and forecasting module 252. Data warehouse 336 may also be secure 338 so that only authorized users can access the data.

Exemplary operational database 202 includes data such as required resources to complete certain requirements and/or requests. Operational data stored in database 202 for a military base may include, but is not limited to, training schedules for military units, housing requirements for military units, medical care for military units, consumables needed by military units, dates of arrival and departure for military units, resources needed to complete the course of training for units and schools, such as classrooms, ranges, ammunition, instructors and weapons.

Construction data store 204 includes information and data regarding the completion of construction, such as construction of buildings and infrastructure. Exemplary construction data for a military base may include range constructions on a military base, infrastructure improvements, the impact of construction on road networks, and impacts on other facilities. Although depicted as construction data for a military base, it will be appreciated that the construction data may be for any geographic region.

Traffic data store 206 includes traffic data such as baseline traffic flow, traffic related to training executions, traffic related to construction, routes and alternative routes, and peak flow. Baseline flow traffic data includes normal traffic for the geographic region. Training execution-related traffic includes traffic for the travel of groups or units within the geographic region, such as a military base. Construction-related traffic data includes traffic information regarding construction vehicles moving and closing of roads due to construction. Peak flow traffic data includes rush hour traffic flow such as in the morning and evening. Traffic data may also include pedestrian traffic information, road closures, and different road networks for different vehicles (e.g., such as roads for tanks vs. roads for passenger vehicles). Although the traffic data is depicted with reference to a military base, it will be appreciated that the construction data may apply to any geographic region.

Physical data store 208 stores data related to civil information, architectural, roadway, electrical, water/wastewater, communications, housing, ranges, environmental, training, air field operations, road networks, terrain, building locations, unit locations, range locations, training facility locations, and classroom locations. The physical data may also include digital aerial and satellite images and digital maps. In some embodiments the physical data may be utilized to create a geospatial model for the geographic region. As before, the geospatial model may be two-dimensional or three-dimensional. The three-dimensional geospatial model may be a digital training model having X, Y, and Z coordinates. It will be appreciated that a geospatial model may also utilize aerial and satellite images, and digital maps in two dimensions.

Scheduling module 240 includes a training facility/classroom engine scheduler 341 and a traffic engine route selector 350. The training facility/classroom engine scheduler 341 schedules training facilities and classroom resources. In some embodiments, the scheduling information, such as the location, time and group scheduled for a particular resource, may be utilized by the forecasting module 252 to forecast the demand and availability of resources, such as classrooms or roadways, for a given time period.

In one embodiment, the facilities scheduler 341 may run a routine to determine whether a particular group may be scheduled for a particular resource. The scheduler 341 determines if there is a shortfall of facilities/resources 342. If so, the facility scheduler 341 may run a resource leveling routine 344 to determine if there are alternatives to the requested facility or resources. The facility scheduler 341 determines whether the group for which the resource is being scheduled is flexible 346. If the group is not flexible, the shortfall of the resources is determined to be an unscheduled requirement 348 and this information may be displayed in a shortfall report 358.

The traffic engine route selector 350 selects a route of travel based on the priority of the group, such as a military unit. The route selector 350 is configured to schedule travel on a road and/or route until it is determined that the route is full and then groups with lower priority are shifted to alternative or secondary routes. If a group is shifted to a lower priority or a secondary route, the group schedule would reflect the increase or decrease in travel time. Groups with the highest priority, for instance units scheduled for deployment on a military base, would be scheduled on the highest priority route with the lowest travel time. In some embodiments, the route selection information, including the defined origination/destination and travel route information for multiple groups (such as units) may be considered to be traffic data utilized by the forecasting module 252 to forecast the demand and availability of resources, such as roadways, for a given time period. Further, in another embodiment, the route selector 350 may divide a road and/or route up into scheduled increments or windows of allowed travel (march credits) for a particular group (or unit). For example, the route selector 350 may divide a route for a unit into multiple segments. The unit would be scheduled to complete each segment in a specified time period (e.g., route is divided into four segments, each segment should be completed in 15 minutes).

Scheduling information from scheduling module 240 and forecasting information from forecasting module 252 may be viewed through viewer 246. Exemplary presentations of scheduling and forecasting information includes a graphical portrayal 356, shortfall report 358, end state snapshot 360, range maintenance tool 362, timing of faculty assignments 364, a two-day simulation 366, GANTT chart 368, reports 370, classroom assignments 372, a two-day green/amber/red indicator 374 and traffic flow display 376.

The system provides military leaders with an operational model and decision support tool that visually and graphically portrays an installation's current and projected functions and activities over time along with its operational requirements and matching resources. The system assists with understanding the impact of changes to the military installation and enables a military installation to execute its operational mission efficiently.

Figure 4:
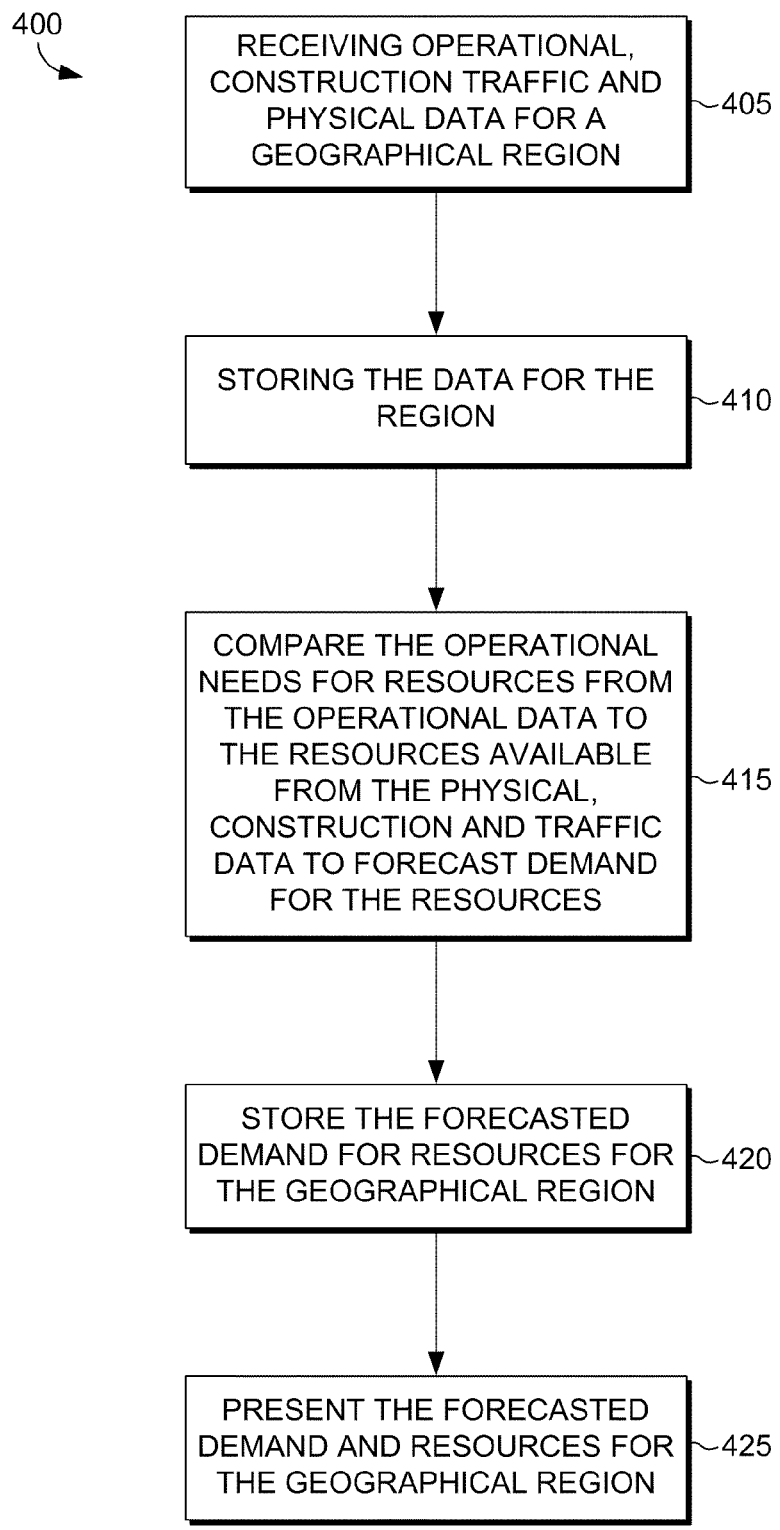
FIG. 4 illustrates a method in accordance with an embodiment of the present invention for presenting forecasted demand and availability of resources for a geographic region.

With reference to FIG. 4, a flow diagram illustrating a method 400 for presenting the forecasted demands and available resources for a geographic region is shown. At step 405, operational, construction, traffic, and physical data for a geographic region is received. At step 410 the data received for the region is stored. At step 415, the operational needs for resources from the operational data is compared to the resources available from the physical, construction, and traffic data to forecast demand and availability of resources for the geographic region and determine if there are enough resources to meet the demand for the time period. It will be appreciated that multiple resources may be forecasted over a given time period. Resources, including, but not limited to, one or more sets of equipment, buildings, classrooms, roadways, housing, personnel, consumables and facilities may be forecasted for a geographic region. At step 420, the forecasted demand for resources to the geographic region is stored. At step 425, the forecasted demands and resources for the geographic region are presented to a user.

Figure 5:
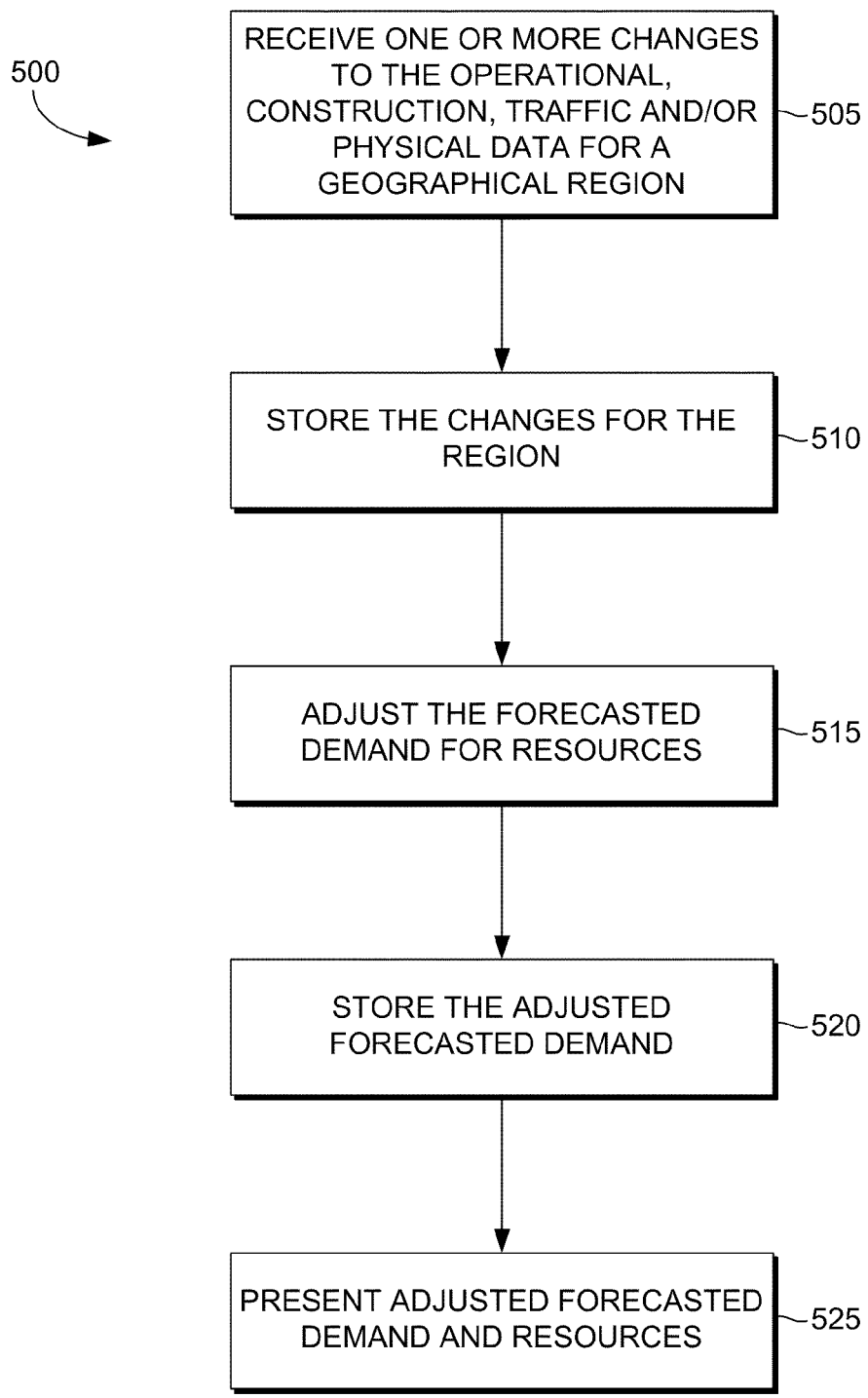
FIG. 5 illustrates a method in accordance with an embodiment of the present invention for presenting adjusted forecasted demand and availability of resources in a geographic region.

Referring next to FIG. 5, a method 500 for presenting the forecasted demand and availability of resources for a geographic region is shown. The demand and availability of resources and any shortfalls in the resources may be presented for a particular period of time. At step 505, changes to the operational, construction, traffic, and/or physical data for a geographic region are received. These changes may be entered by a user or may be based on scheduling data. At step 510, the changes to the data for the geographic region are stored. At step 515, any adjustments that need to be made on the forecasted demand for resources based on the changes to the data are made. At step 520, the adjusted forecasted demand is stored. At step 525, the adjusted forecasted demand and associated resources are presented to a user, in some instances on an interactive graphical user interface. This functionality allows for evaluation of the impact on resources to construction schedule changes, the evaluation of additional relocation or reorganization of groups (e.g., military units) and adjustment to requirements. For a military installation, a "what if" functionality is provided so that parameters and data may be adjusted to determine the impact of changes in resources and requirements, including but not limited to, an increase or decrease in population, deploying of a unit, change in unit size, change in unit relocation timing, and change in the start date and completion date of construction of resources. This is exemplified in FIGS. 12 and 13.

Figure 6:
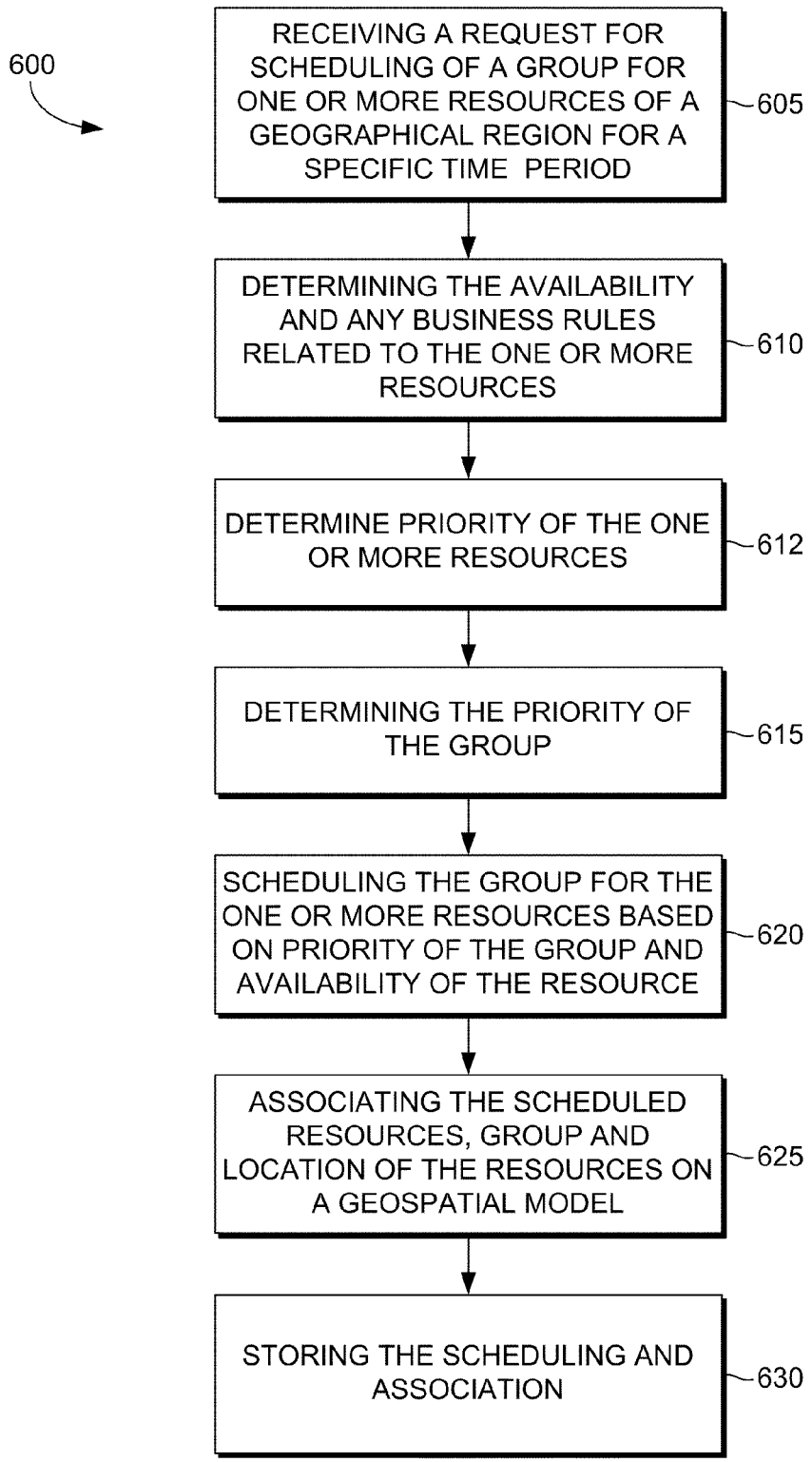
FIG. 6 illustrates a method in accordance with an embodiment of the present invention for scheduling resources in a geographic region.

Referring next to FIG. 6, a method 600 for associating scheduled resources, a group and location of the resources is shown. At step 605, a request for scheduling for a group of one or more resources of a geographic region for a specific time period is received. At step 610, the availability of the one or more requested resources is determined. This may be done by accessing classroom schedules, range schedules, housing schedules and instructor schedules. This may also be determined by accessing traffic route schedules. At step 612 the priority of the one or more resources to be scheduled is determined. For example, a particular resource, such as a tank range may have a high priority and thus only certain groups may schedule the tank range. At step 615, the priority of the group is determined. The priority of the group may be determined from operational data. For example, in a military base application, the priority of the group may be affected by whether the military unit is being deployed. At step 620, one or more resources are scheduled for the group based on the priority of the group, the availability of the resource and the priority of the resource. At step 625, the scheduled resources group and location of the resources on the geospatial model are associated. At step 630, the scheduling of the resources and the association information is stored.

Figure 7:
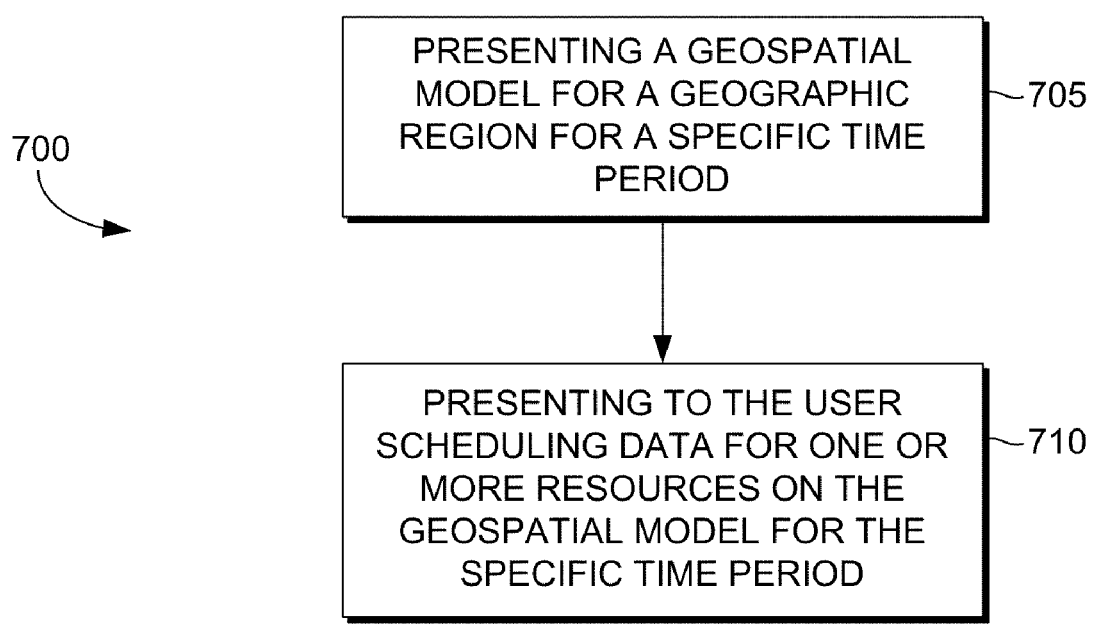
FIG. 7 illustrates a method in accordance with an embodiment of the present invention for presenting scheduling data for one or more resources on a geospatial model.

Referring next to FIG. 7, a method for presenting to a user scheduling data for one or more resources within a geographic region for the specific time period is shown. At step 705, a geospatial model for a geographic reason for a specific time period is presented as a graphical user interface. At step 710, scheduling data for one or more resources within the geographic region is presented to the user on the geospatial model. Exemplary graphical user interfaces with scheduling data for one or more resources in a geospatial model are shown in FIGS. 14, 16, 19, and 21.

It will be appreciated that all of the graphical user interfaces described below contain displays and may be interacted with by a user. Furthermore, each user interface comprises a variety of fields displaying information and data. In some embodiments, fields within the graphical user interface may be populated, selected, interacted with or drilled down upon by a user. In response to user interaction, additional information may be presented to the user on a different graphical user interface display or on the currently presented graphical user interface display. Furthermore, throughout the following graphical user interfaces the user is provided with the capability of selecting or specifying the time period for which they want to view a geospatial model, forecasting data and scheduling data. Thus, the graphical user interfaces may be presented for any variety of time periods for which information or data is available.

Figure 8:
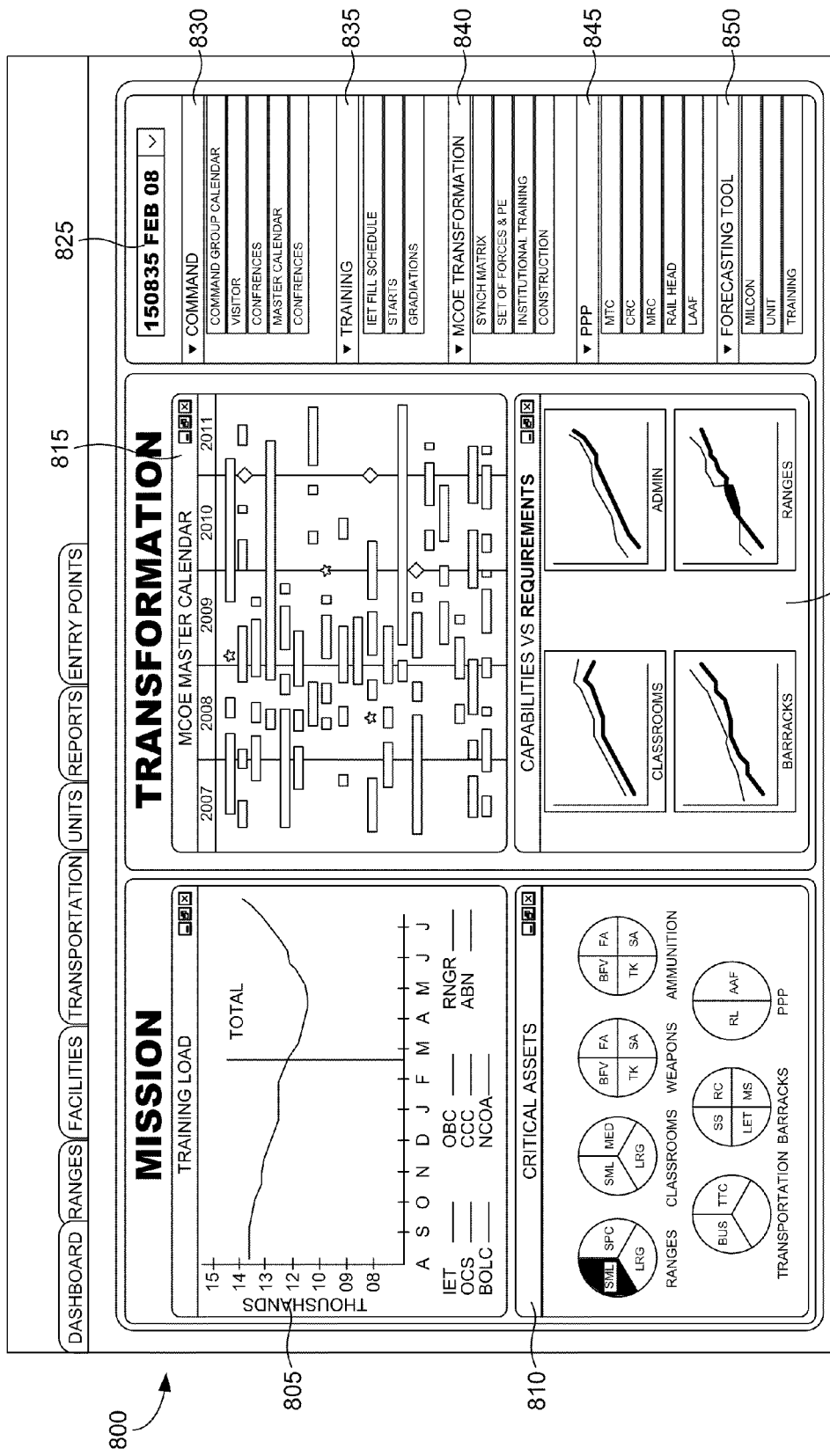
FIG. 8 depicts a graphical user interface for presenting forecasted demand and availability of resources for a geographic region over period of time in accordance with an embodiment of the present invention.

FIG. 8 is an interactive graphical user interface 800 or dashboard. The content presented on graphical user interface 800 is based on the user and security level of the user. For example, a leader or commander may have security to view all forecasted demand and availability of resources and all scheduling data for resources, while a unit leader or requestor may only be able to view a weeks worth of scheduling data for resources for his or her unit.

Exemplary user interface 800 includes a graphical representation 805 of the number of soldiers being trained on the base over the period of a year. Interface 800 also includes the Maneuver Center of Excellence (MCOE) master calendar 815 depicting forecasted demand and availability of resources over a five (5) year period. Interface 800 also depicts charts of forecasted critical assets 810 for the military base including ranges, classrooms, weapons, ammunition, transportation, barracks and power projection platform (PPP). Critical assets 810 that are limited in forecasted capacity and availability may be highlighted. In FIG. 8, the forecasted availability of ranges is limited, and as such the ranges are highlighted.

Furthermore, critical assets 810 may be colored coded to indicate forecasted capacity level. Interface 800 also includes a graphical representation 820 of forecasted capabilities versus requirements. As can be seen from the interface, the number of ranges forecasted to be available for training in February 2008 (825) is limited. From interface 800, data for other dates and time periods 825 may be accessed. For example, a user may wish to view the forecasted demand and availability of resources for March 2008 by selecting the date from field 825. A user may also link to other data by selecting a field including command information 830, training information 835, MCOE transformation information 840, PPP information 845 and a forecasting tool 850.

Figure 12:
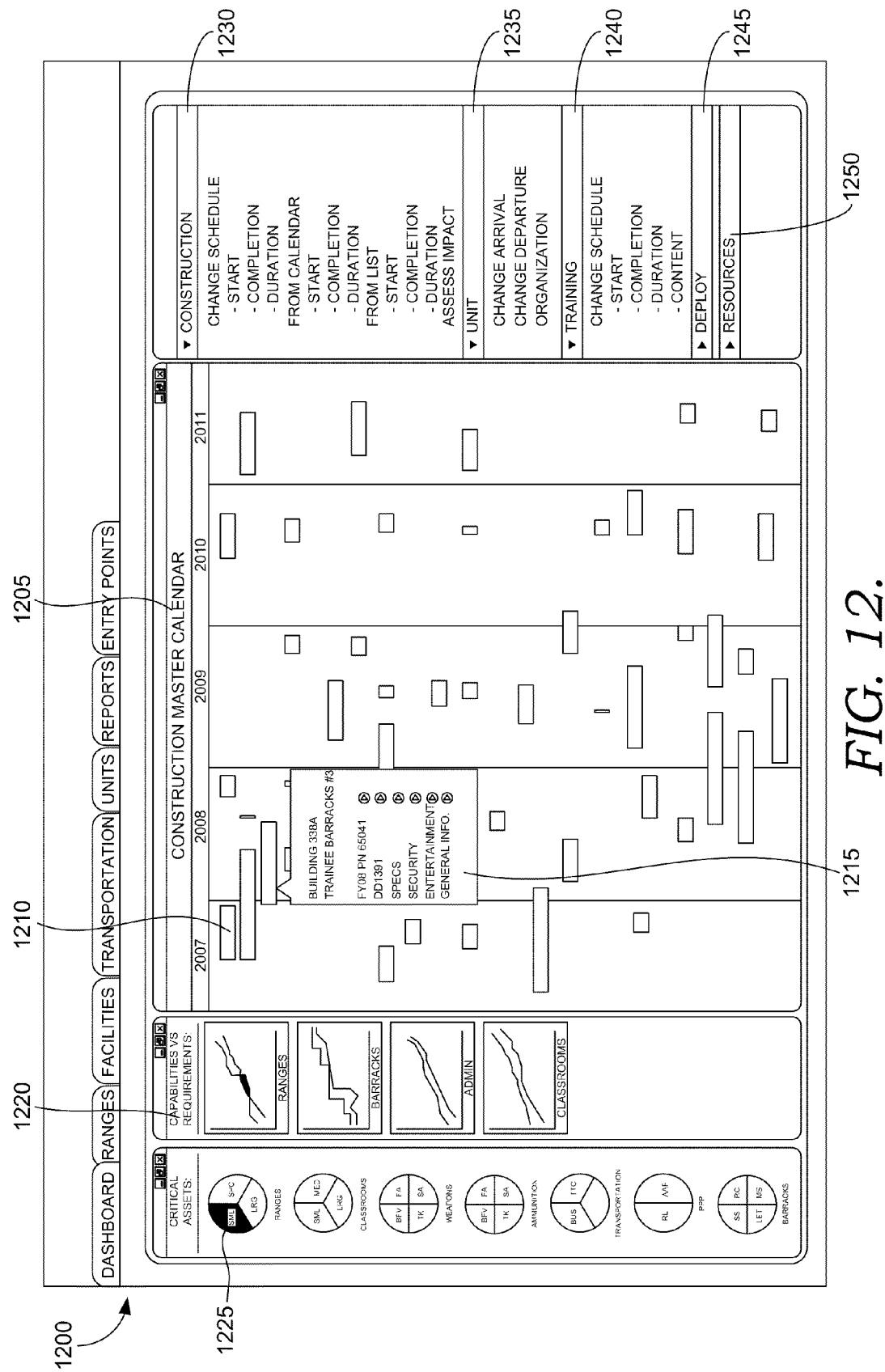
FIG. 12 depicts a graphical user interface and method for presenting a resource construction schedule in accordance with an embodiment of the present invention.

By way of example, the military construction forecasting tool 850 may be selected, thereby linking a user to graphical user interface 1200 for forecasting tool 850 of FIG. 12. Interactive graphical user interface 1200 depicts a construction master calendar 1205. Graphical user interface 1200 also includes graphical representations of critical assets 1225 and capabilities vs. requirements 1220. Construction master calendar 1205 depicts construction projects for the military base over the next five (5) years. Each block on the construction master calendar depicts a different construction project, including housing, classrooms, ranges, mess halls and the like. For each block 1210, pertinent construction information may be displayed in a pop-up window or the like. For example window 1215 includes construction information or metadata related to training barracks being constructed. Furthermore, window 1215 includes a link to a portable document formal (PDF) copy of an engineering document, such as a corps of engineering document. A user may also link to unit information 1235, training information 1240, deployment information 1245 and other resources 1250 from interface 1200.

Graphical user interface 1200 is interactive and a user may change the projected completion date, start date and/or duration of a construction project by moving the construction block 1210 or by otherwise entering the change. For example, if the start date and completion date for training barracks 1215 will be delayed, a user may make the change and rerun the application to assess the impact of the construction change on the forecasted demand and availability of resources for the time period.

Figure 13:
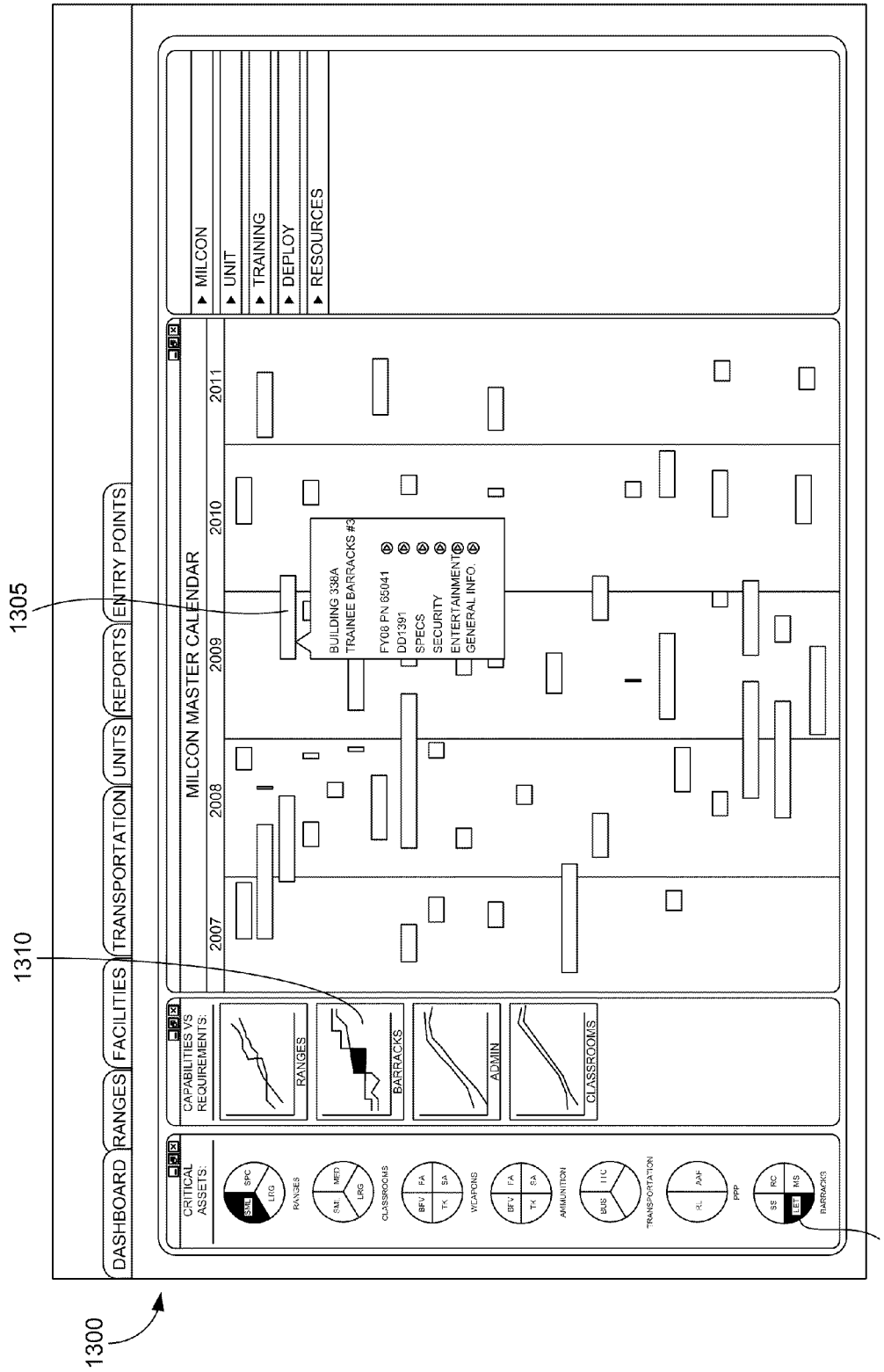
FIG. 13 depicts a graphical user interface and method for changing a resource construction schedule in accordance with an embodiment of the present invention.

With reference to FIG. 13, a graphical user interface 1300 for forecasting tool 850 depicting the impact of the change in the start date and the completion date of the construction of the trainee barracks is shown. As can be seen in FIG. 13, a shortage of trainee barracks in light of the construction change is reflected the graphical representations of critical assets 1315 and capabilities vs. requirements 1310. Furthermore, a link to a report to help solve the resource shortage may be provided. For example, the report depicting available beds in other barracks may be accessed so that a unit may still be transferred to the military base even with the construction delay. It will be appreciated that, while FIGS. 12 and 13 depict resources for constructed buildings, similar graphical user interfaces may be used to depict a variety of resources for the military base or a geographic region.

Figure 11:
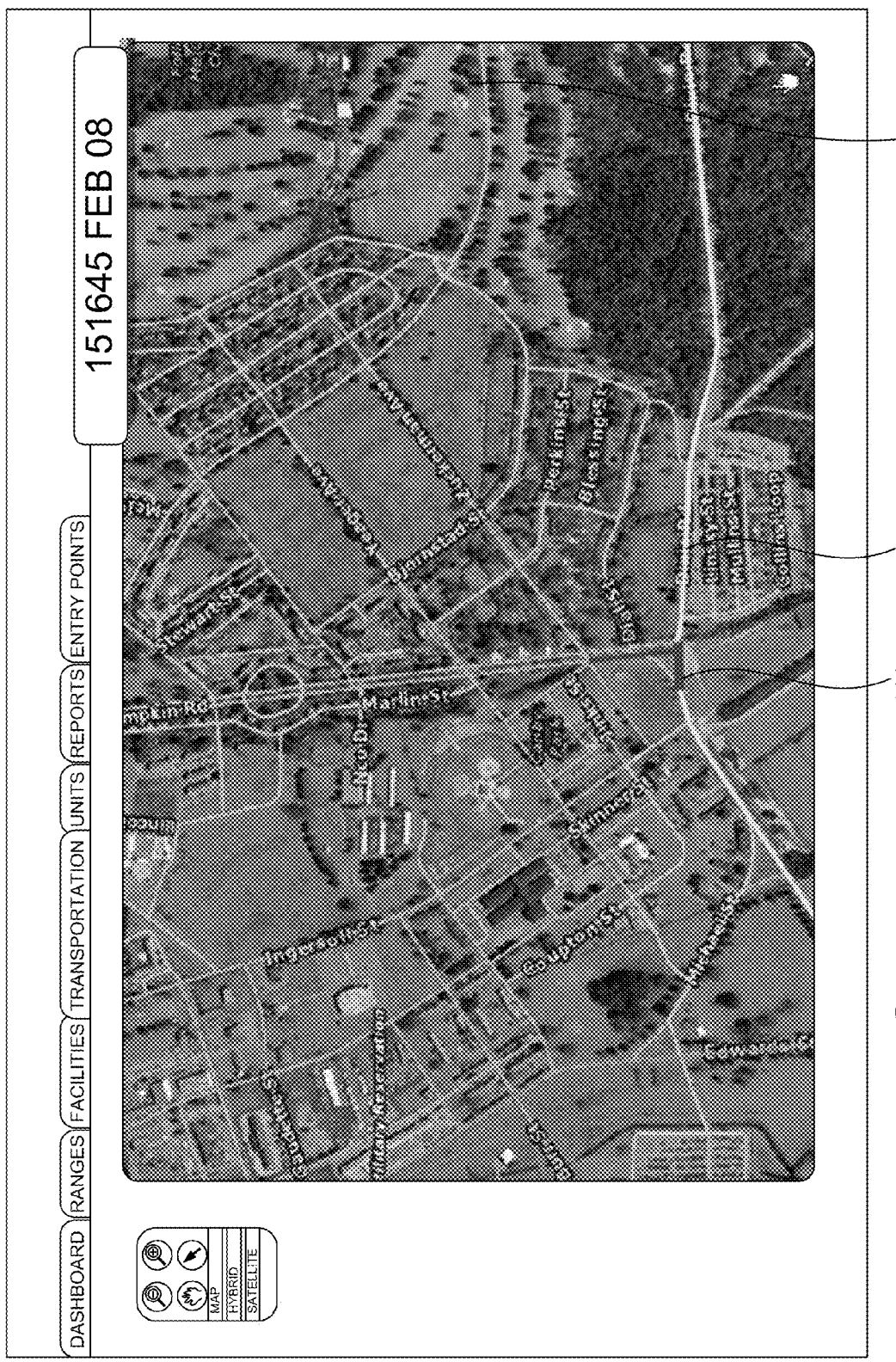
FIG. 11 depicts a graphical user interface and method for presenting forecasted demand and availability of traffic resources in accordance with an embodiment of the present invention.

By way of example, the forecasting tool 850 in FIG. 8 may be selected, thereby linking a user to graphical user interface 1100 of FIG. 11. Graphical user interface 1100 of includes a geospatial model 1105 of roadways 1110 on the military base at 16:45 hours on Feb. 15, 2008. Utilizing the traffic data for the military base, a traffic back-up is forecasted during this time period at intersection 1115. The forecasting module may determine that the forecasted demand for the roadway resources exceeds the capacity of the roadway and intersection, and as such, the area where the traffic back-up is forecasted is highlighted to indicate to the user that vehicles using the intersection 1115 during this time period may be delayed.

Referring next to FIG. 14, an exemplary graphical user interface 1400 of a geospatial model for a resource and related scheduling information 1415 is shown. FIG. 14 depicts a close-up image of a small arms range 1410 for time period 1405 of Jan. 12, 2008 at 9:00 a.m. Interface 1400 includes an indicator 1435, such as an icon, indicating that the range is scheduled or forecasted to be in use for that time period. In this example, Malone 12 range is being utilized by unit: A/2-81 AR during time period 1405. Furthermore, while the range is in use, the surface danger zone 1430 (area where a bullet may stray) may be depicted on the geographic model for the range along with the closure of a road passing through danger zone 1430 (road is closed due to the surface danger zone).

Figure 15:
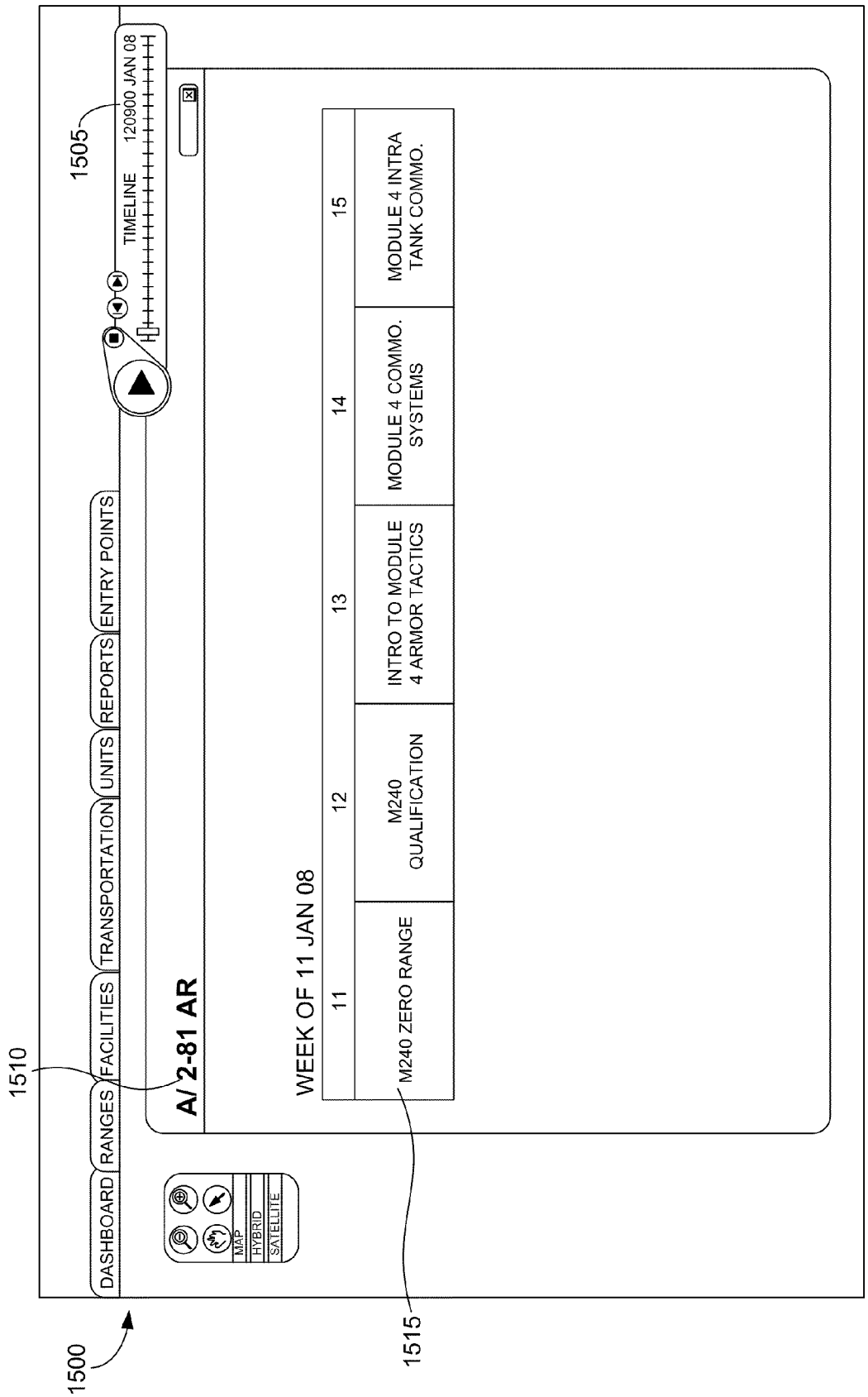
FIG. 15 depicts a graphical user interface that presents a schedule for a group in accordance with an embodiment of the present invention.

It will be appreciated that a user may also be able to link or select the training schedule for the unit 1420 from interface 1400. FIG. 15 is a graphical user interface of the training schedule for unit A/2-81 AR for the week of Jan. 11, 2008. As can be seen from FIGS. 14 and 15, scheduling data may be easily viewed by a user from a geospatial model. Furthermore, additional scheduling data for the unit may be easily accessed from the geospatial model.

By way of example but not limitation, with reference to FIG. 15, for unit A/2-81 AR to complete the M240 Qualification on Jan. 12, 2007, a variety of resources will need to be scheduled and made available to unit A/2-81 AR. The multiple resources to be scheduled and made available to unit A/2-81 AR include weapons, ammunition, instructors, ambulance transportation, a range venue (here, Malone 12), activation of the surface danger zone and closure of roads within the surface danger zone, training aids, devices, simulations, simulators, transportation and a scheduled road network to travel to and from the range venue.

By way of example, the scheduled road network may be the scheduled incremental movement or windows of allowed travel of the unit (or march credits). For example, unit A/2-81 AR may be scheduled to start training on range Malone 12 at 9:00 a.m. on Jan. 12, 2008. It is determined that it will take approximately one hour and 30 minutes for A/2-81 AR to travel from their barracks to range Malone 12. As such, the road network between A/2-81 AR barracks and range Malone 12 is divided into three segments. The unit may be scheduled to complete each segment in 30 minutes. Progress of the unit and completion of each segment may be monitored by checkpoints along the road network.

As such, Unit A/2-81 AR should leave their barracks at 7:30 a.m., complete segment 1 by 8:00 a.m., complete segment 2 by 8:30 and segment 3 by 9:00 having them arrive at Malone 12 at 9:00 a.m. to begin training. These incremental segments or windows of allowed travel may be scheduled for a group, such as unit A/2-81 AR and the scheduled travel may be depicted on a graphical user interface depicting a geospatial model to be tracked by users.

Figure 16:
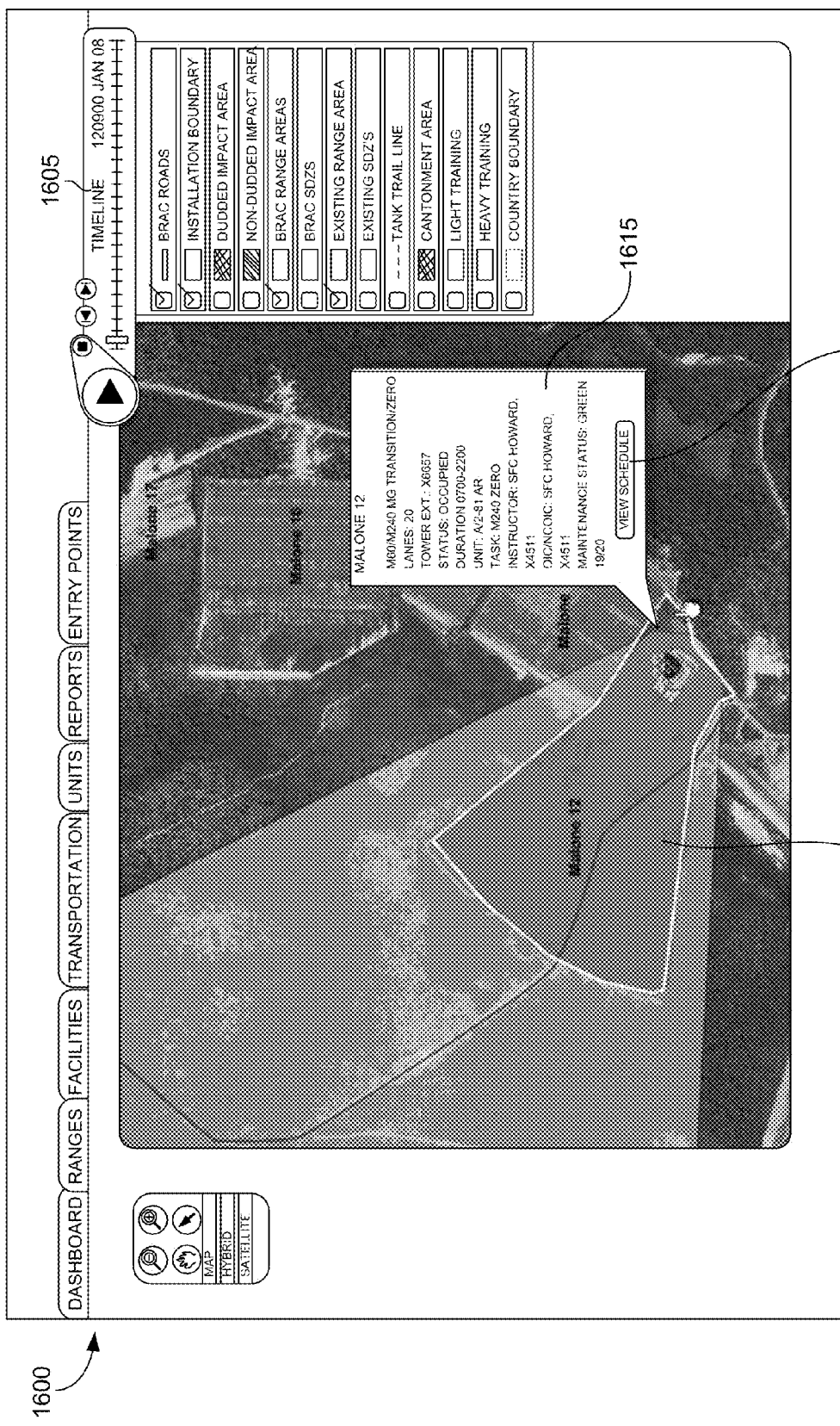
FIG. 16 depicts a graphical user interface that presents scheduling data for a group on a geospatial model in accordance with an embodiment of the present invention.

Referring next to FIG. 16, an exemplary graphical user interface 1600 of a geospatial model for a resource and related scheduling information 1615 is shown. FIG. 16 depicts a close-up image of a small arms range 1610 for time period 1605 of Jan. 12, 2008 at 9:00 a.m. Interface 1600 includes an indicator, such as an icon, indicating that the range is scheduled or forecasted to be in use for that time period. The scheduling information 1615 includes information regarding the resource (range) and regarding the unit scheduled to utilize the range.

Figure 17:
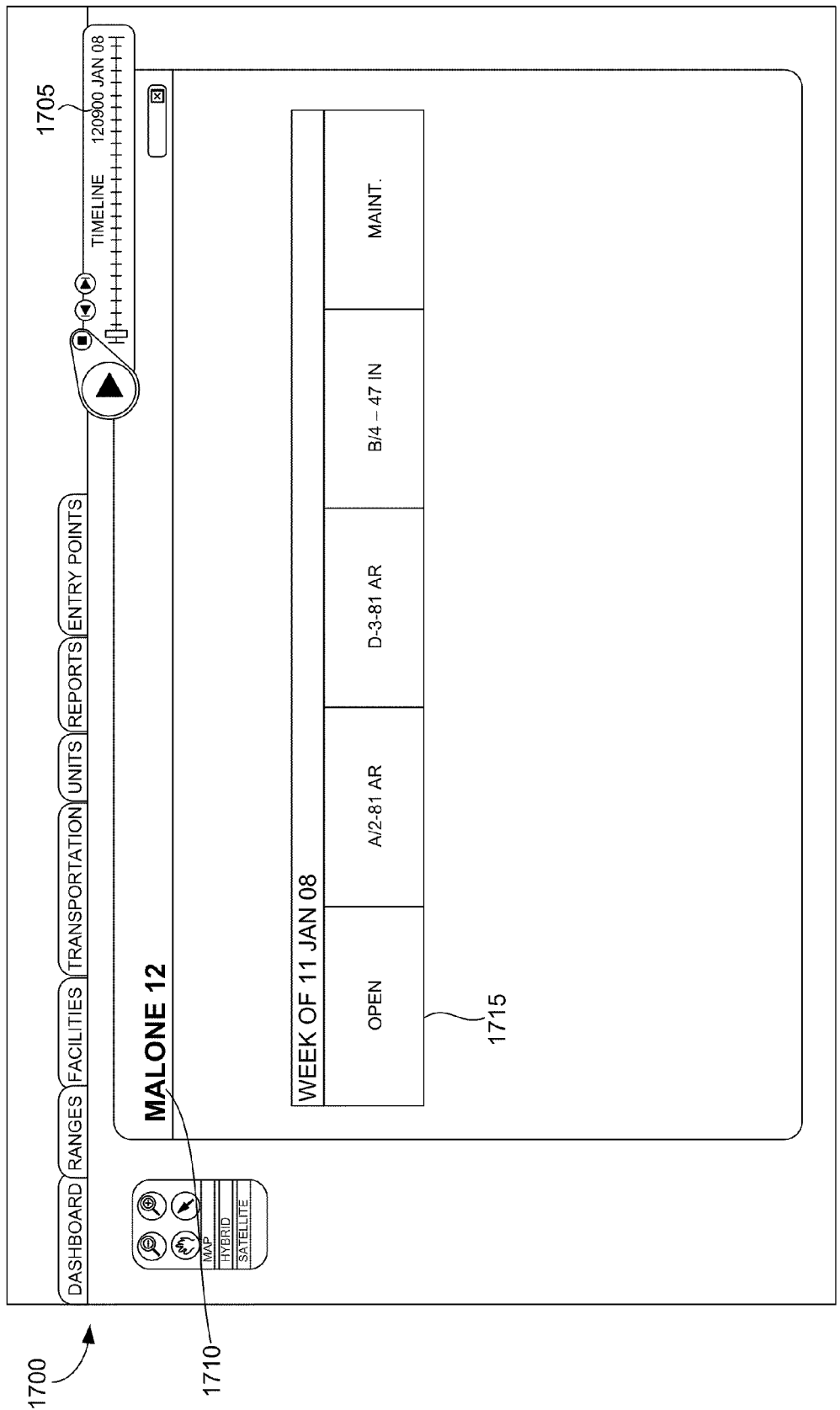
FIG. 17 depicts a graphical user interface that presents scheduling data for a group in accordance with an embodiment of the present invention.

It will be appreciated that a user may also be able to link or select the scheduling information 1620 from interface 1600 to view more scheduling information for the resource. FIG. 17 is a graphical user interface of the training schedule the resource (e.g., Malone 12 range) for Jan. 11, 2008. For example, FIG. 17 shows the different groups or units scheduled to utilize the resource the week of Jan. 11, 2008. As can be seen from FIGS. 16 and 17, scheduling data for the resource may be easily viewed by a user from a geospatial mode and additional scheduling data for the resource may be easily accessed from the geospatial model.

Figure 18:
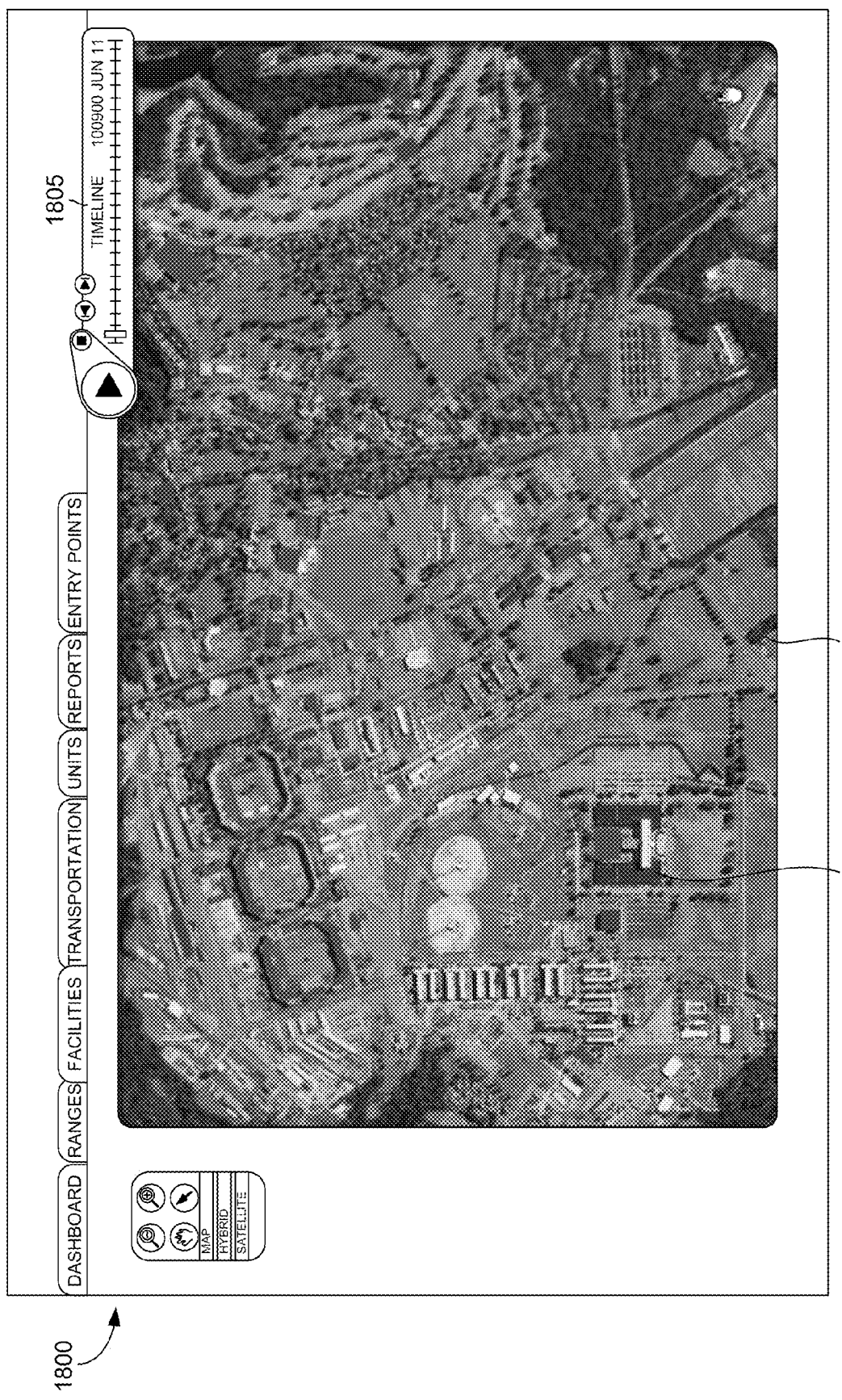
FIG. 18 depicts a graphical user interface that presents geospatial model and timeline in accordance with an embodiment of the present invention.

FIG. 18 depicts a graphical user interface 1800 that presents geospatial model 1810 and timeline 1805 in accordance with an embodiment of the present invention. A resource field 1815 may be selected from the geospatial model 1810 by a user. Upon selection of the resource field 1815, scheduling data for the resource and the time period may be presented or displayed to the user. For example, upon selection of resource field 1815, scheduling data for the selected classroom building resource for Jun. 10, 2011 may be presented to the user, as shown in FIG. 19.

Figure 19:
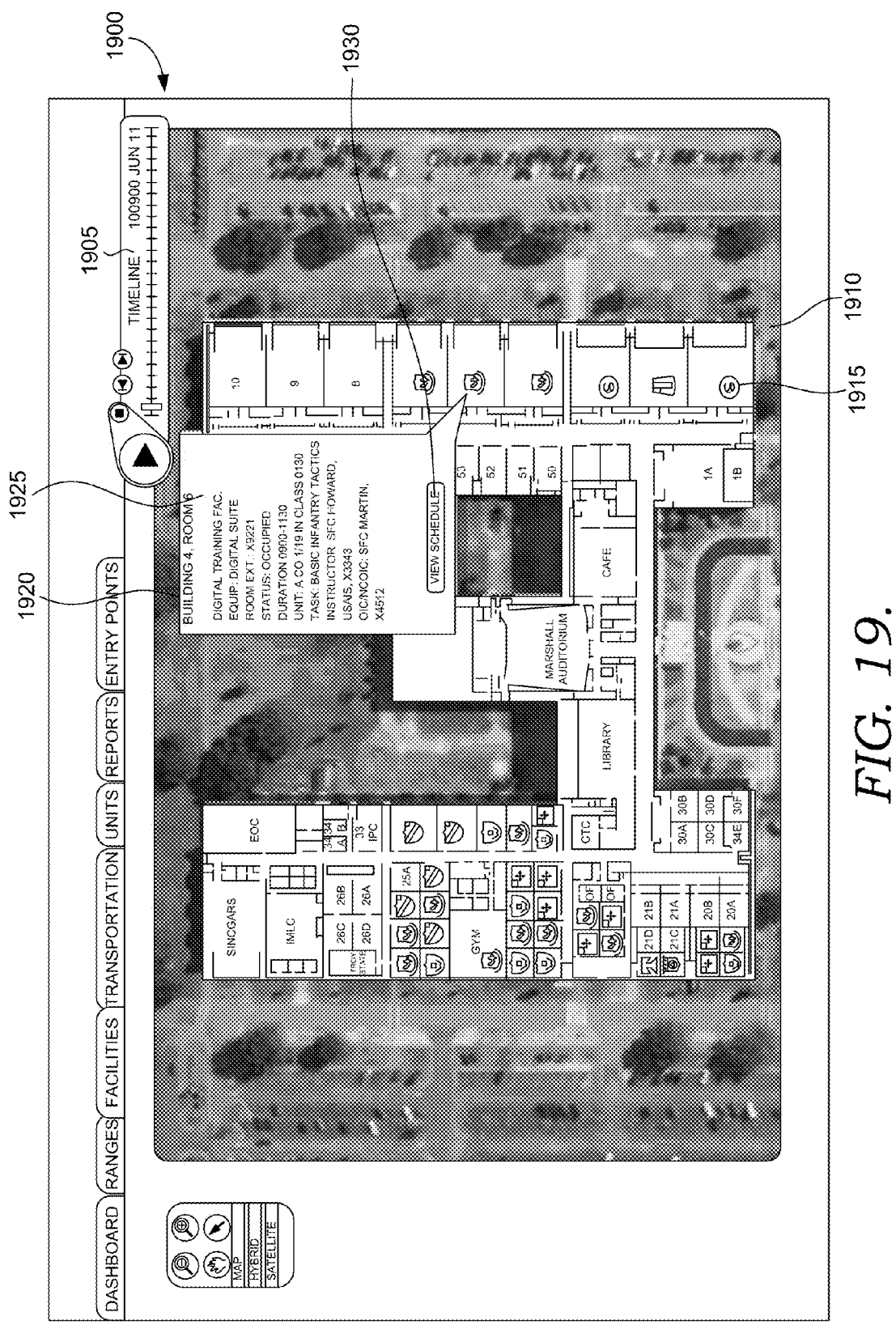
FIG. 19 depicts a graphical user interface of a geospatial model and scheduling data for a resource in accordance with an embodiment of the present invention.

FIG. 19 depicts a graphical user interface 1900 of a geospatial model 1910 and scheduling data for a resource in accordance with an embodiment of the present invention. The resources depicted in FIG. 19 are a classroom building and classrooms 1920. Information regarding whether the classrooms are scheduled and unscheduled for the time period 1905 of Jun. 11, 2007 at 9:00 a.m. is displayed. For example, an indication or icon 1915 identifies classrooms for which a class has been scheduled for that time period. The available classrooms are numbered and shown as available (e.g., classrooms 8-10). Additional scheduling information 1925 for each scheduled classroom may be shown in window 1920. Furthermore, additional information regarding the scheduled classroom may be linked 1930 so that a requestor or leader may see the classroom schedule for that particular classroom for planning purposes. For example, an instructor may be looking for an open classroom for some period on Jun. 11, 2007. Upon selection of link or field 1930, graphical user interface 2000 of FIG. 20 may be presented.

Figure 20:
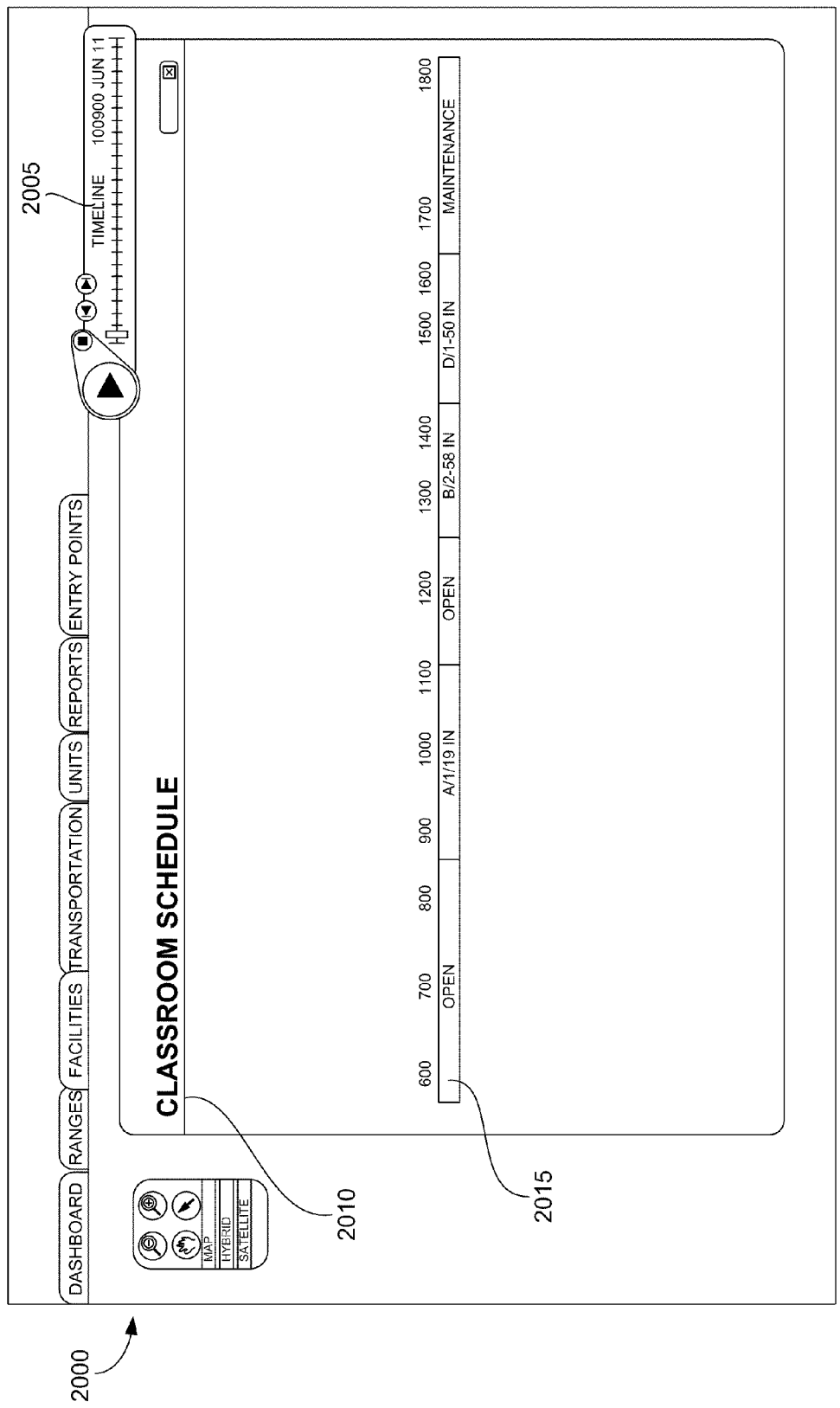
FIG. 20 depicts a graphical user interface and scheduling data for a classroom resource in accordance with an embodiment of the present invention.

FIG. 20 depicts a graphical user interface 2000 and scheduling data 2015 for a classroom resource 2010 in accordance with an embodiment of the present invention. The scheduled classes and units for the classroom resource 2010 for the time period 2005 of Jun. 8, 2008 may be displayed in graphical user interface 2000. It will be appreciated that other scheduling data may also be displayed in FIG. 20 as well. By way of example, with reference to FIG. 20, for unit A/1 19 IN to complete the course scheduled from 9 a.m. to 11 a.m. on Jun. 10, 2011, multiple resources will need to be scheduled and made available for the unit. For example, the unit will need a classroom that seats 100 students, manuals for 100 students, instructors, a projector and other training aids. These resources are scheduled by scheduling module 240 of FIG. 2 such that the unit can complete their required training course in a timely manner.

Figure 21:
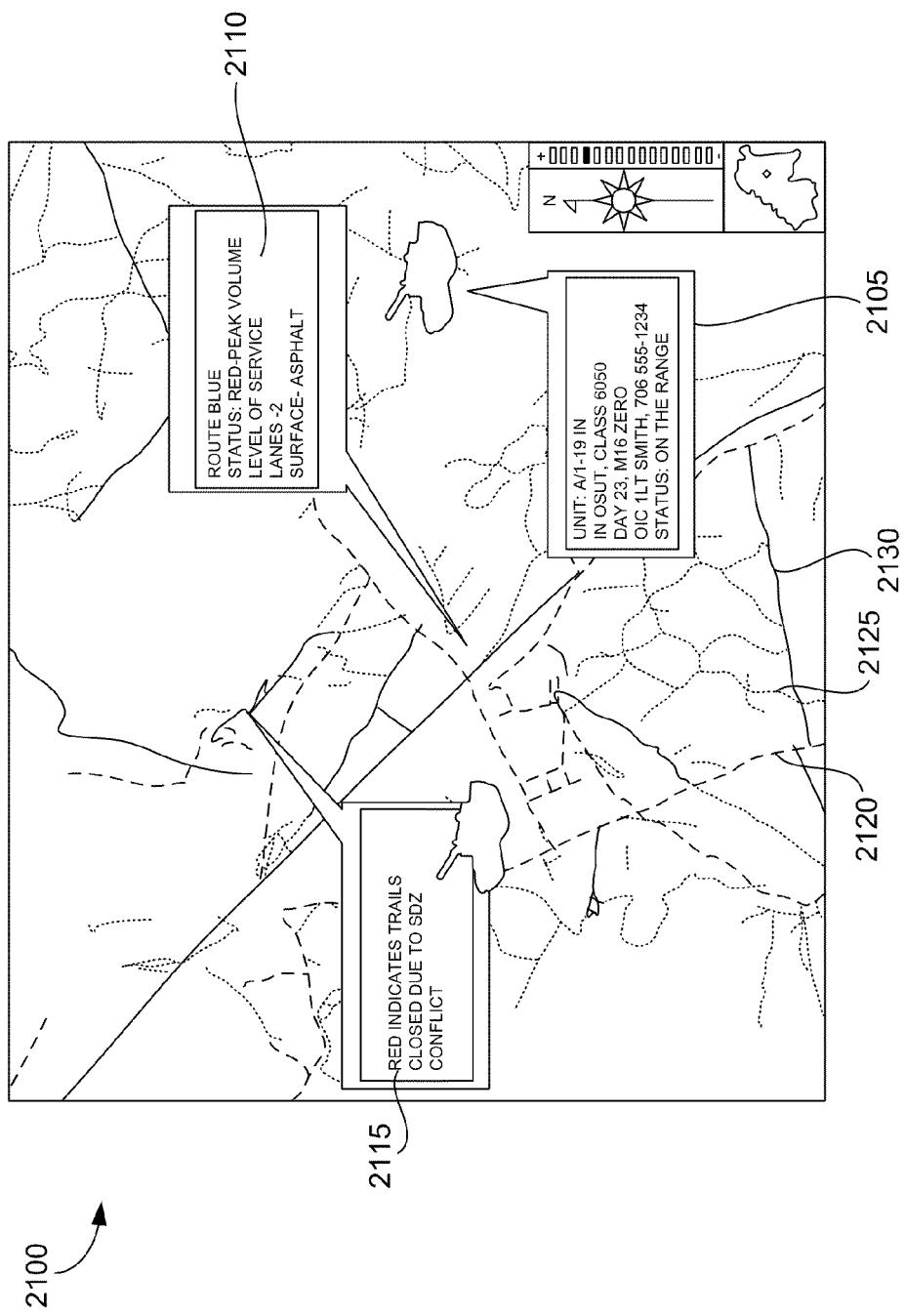
FIG. 21 depicts a graphical user interface presenting scheduling data for multiple resources within a geographic region in accordance with an embodiment of the present invention.

FIG. 21 depicts a graphical user interface 2100 presenting scheduling data for multiple resources 2105, 2110 and 2115 within a geographic region in accordance with an embodiment of the present invention. FIG. 2 includes a geospatial model of a digital roadway map. The digital roadway map includes roads and trails. From the map, a user can see what roads and trails have been closed due to scheduled "conflict" or use of ranges or training area for the time period. Roadways or trails depicted by small dashed lines 2125 are closed due to scheduled conflict/use of a range. Roadways or trails depicted by large dashed lines 2120 are full with scheduled traffic. Roadways or trails depicted by solid lines 2130 are available for use. In some embodiments, the roadway or trail closure and traffic volume may be color-coded.

Additional information for scheduled resources 2105, 2110 and 2115 is depicted in pop-up windows. For example, the scheduled use of a range resource 2105 and related scheduling information is presented in pop-up window on the geospatial model. Scheduled use of a roadway resource 2110 is presented in a pop-up window on the geospatial model. Scheduled closure of roadway resource 2115 due to the scheduled use of the range is presented in a pop-up window on the geospatial model. While the scheduled resource and scheduling information is depicted as being presented in a pop-up window in FIG. 21, it will be appreciated that the scheduled resource and scheduling information may be presented or displayed in a variety of manners. From FIG. 21, a user may accurately see scheduled resources and the impact of the scheduled resources on other resources (e.g., scheduled use of range causes road closure and peak traffic volume on roadways).

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. A computer system for forecasting demand and availability of resources of a geographic region, the system comprising:
   a processing unit; and
   a memory for storing computer-executable instructions that when executed by the processing unit executes:
   a receiving component configured for receiving and facilitating the storing of physical, operational, traffic and construction data for a geographic region of a military facility for a specified time period;
   a determining component configured for determining a number of requests for at least one resource of the geographic region of the military facility for a specified time period from the operational data;
   a comparing component configured for comparing the number of requests for at least one resource of the geographic region of the military facility for a specified time period to the resources indicated as being available from the physical data, construction data and traffic data for the geographic region of the military facility for the specified time period;
   a forecasting component configured for forecasting utilizing the number of requests for the at least one resource a demand and availability of the at least one resource for the geographic region of the military facility over the specified time period and to determine if the demand for the at least one resource exceeds the availability of the at least one resource;
   a storing component that stores the forecasted demand and availability of the at least one resource for the geographic region of the military facility for the specified time period; and
   a presentation component for presenting to a user the demand and availability of the at least one resource for the geographic region of the military facility over the specified time period.

2. The computer system of claim 1, wherein the operational data comprises resources needed to complete requirements or requests.

3. The computer system of claim 2, wherein the resources comprise one or more of classrooms, buildings, land, ranges, roadways, repairs, personnel and transportation.

4. The computer system of claim 3, wherein the construction data is data regarding the start and completion dates of construction of buildings and infrastructure.

5. The computer system of claim 4, wherein the traffic data comprises traffic flow data for one or more roadways within the geographic region traffic.

6. The computer system of claim 5, wherein the physical data is data regarding the physical layout of the geographic region of the military facility including building locations and infrastructure.

7. The computer system of claim 6, wherein the physical data comprises one of digital aerial images, digital satellite images, and digital maps.

8. The computer system of claim 7, wherein the one of digital aerial images, digital satellite images, and digital maps may be utilized to create a geospatial model for the geographic region of the military facility.

9. The computer system of claim 8, wherein the military facility is one of a military installation, a military base, an army base, a naval base, and an air force base, a university and an airport.

10. The computer system of claim 9, wherein the geographic region of the military facility, includes at least one of a municipality, a city, a school, a university and an airport.

11. The computer system of claim 10, wherein the receiving component is configured to receive one or more changes to the at least one of the physical, operation, traffic and construction data.

12. The computer system of claim 11, wherein the comparing component is configured to utilize the changes to the at least one of the physical operational, traffic and construction data to reforecast the demand and availability of the at least one resource for the geographic region over the specified time period.

13. One or more computer-storage media having computer-useable instructions embodied thereon for causing a computing device to perform a computer-implemented method for presenting on a display device a geospatial model for a geographic region of a military facility and associated scheduling data for one or more resources of the geographic region of the military facility, the method comprising:
  presenting to a user a geospatial model for a geographic region of a military facility for a specified time period;
  determining using physical, operational, traffic and construction data for the geographic region of the military facility for a specified time period an operational need for one or more resources of the geographic region of the military facility;
  forecasting a schedule for one or more resources of the geographic region of the military facility based on the operational need for the one or more resources and the physical, operational, traffic and construction data for the geographic region of the military facility for a specified time period; and
  presenting to the user scheduling data for one or more resources of the geographic region of the military facility within the geospatial model for the specified time period.

14. The method of claim 13, wherein the scheduling data is presented within the geospatial model at coordinates where the resource is located.

15. The method of claim 14, further comprising:
  receiving selection of one or more resources within the geographic region of the military facility by a user from a graphical user interface presenting the geospatial model for the geographic region of the military facility for the specified time period and presenting the scheduling data for the one or more resources of the geographic region of the military facility within the geospatial model for the specified time period in response to the user's selection.

16. The method of claim 15, wherein the scheduling data is for use of the one or more resources by a group.

17. The method of claim 16, wherein the geospatial model is created utilizing one or more of a digital terrain model, digital satellite images, digital aerial images, digital maps and combinations thereof.

18. The method of claim 17, wherein the one or more resources comprise one or more of classrooms, buildings, land, ranges, roadways, repairs, personnel and transportation.

19. The method of claim 18, wherein military facility is one of a military installation, a military base, an army base, a naval base, and an air force base, a university and an airport.

20. One or more computer-storage media having computer-useable instructions embodied thereon for causing a computing device to perform a computer-implemented method for forecasting demand and availability of resources for a military installation, the method comprising:
  receiving and storing of physical, operational, traffic and construction data for a geographic region of a military facility for a specified time period;
  determining a number of requests for at least one resource of the geographic region of the military facility for a specified time period from the operational data;
  comparing the number of requests for at least one resource of the geographic region of the military facility for a specified time period to the resources indicated as being available from the physical data, construction data and traffic data for the geographic region of the military facility for the specified time period;
  forecasting utilizing the number of requests for the at least one resource a demand and availability of the at least one resource for the geographic region of the military facility over the specified time period and to determine if the demand for the at least one resource exceeds the availability of the at least one resource;
  storing the forecasted demand and availability of the at least one resource for the geographic region of the military facility for the specified time period; and
  presenting to a user the demand and availability of the at least one resource for the geographic region of the military facility over the specified time period.

* * * * *